(12) United States Patent
Nakayama et al.

(10) Patent No.: US 10,801,595 B2
(45) Date of Patent: Oct. 13, 2020

(54) BALL SCREW DEVICE AND STEERING DEVICE

(71) Applicant: JTEKT CORPORATION, Osaka-shi, Osaka (JP)

(72) Inventors: Takuya Nakayama, Okazaki (JP); Keisuke Ogawa, Toyota (JP)

(73) Assignee: JTEKT CORPORATION, Osaka-shi (JP)

( * ) Notice: Subject to any disclaimer, the term of this patent is extended or adjusted under 35 U.S.C. 154(b) by 112 days.

(21) Appl. No.: 16/155,157

(22) Filed: Oct. 9, 2018

(65) Prior Publication Data

US 2019/0136947 A1 May 9, 2019

(30) Foreign Application Priority Data

Nov. 6, 2017 (JP) .................................. 2017-213901
Nov. 6, 2017 (JP) .................................. 2017-213902

(51) Int. Cl.
*F16H 25/22* (2006.01)
*B62D 5/04* (2006.01)
*F16H 25/20* (2006.01)

(52) U.S. Cl.
CPC ....... *F16H 25/2219* (2013.01); *B62D 5/0424* (2013.01); *B62D 5/0448* (2013.01); *F16H 25/2223* (2013.01); *F16H 2025/2081* (2013.01); *F16H 2025/2096* (2013.01)

(58) Field of Classification Search
CPC ............. F16H 25/2219; F16H 25/2223; F16H 25/2081; F16H 2025/2096; B62D 5/0424; B62D 5/0448
See application file for complete search history.

(56) References Cited

U.S. PATENT DOCUMENTS

| | | | | |
|---|---|---|---|---|
| 2011/0296939 | A1* | 12/2011 | Kaneko | F16H 25/2214 74/424.87 |
| 2013/0233103 | A1* | 9/2013 | Asakura | B62D 5/0448 74/89.23 |
| 2014/0096634 | A1* | 4/2014 | Motoyama | F16H 25/2214 74/424.86 |
| 2014/0290410 | A1* | 10/2014 | Asakura | F16H 25/2219 74/424.87 |

(Continued)

FOREIGN PATENT DOCUMENTS

| | | |
|---|---|---|
| JP | 2010-71411 A | 4/2010 |
| JP | 2015-45394 A | 3/2015 |
| JP | 2019-086067 A | 6/2019 |

*Primary Examiner* — Zakaria Elahmadi
(74) *Attorney, Agent, or Firm* — Oliff PLC

(57) ABSTRACT

To provide a ball screw device and a steering device capable of securing smooth circulation of balls while suppressing occurrence of clogging of the balls caused by displacement in a radial direction between a deflector and a nut main body. A ball screw device includes a ball screw nut and a circulation path. The ball screw nut includes a nut main body and a deflector. The deflector includes an inclined portion provided at a peripheral part of a connection portion between a passage and the circulation path of the nut main body for securing passing of the balls at the connection portion when an insertion position of the deflector with respect to the deflector mounting hole is displaced from a desired position within a range of a given distance.

15 Claims, 10 Drawing Sheets

(56) References Cited

U.S. PATENT DOCUMENTS

2015/0284020 A1* 10/2015 Asakura .............. F16H 25/2204
  180/444
2016/0207566 A1*  7/2016 Ito ....................... F16H 25/2219
2017/0225706 A1*  8/2017 Yamazaki ............ B62D 5/0448
2017/0259844 A1*  9/2017 Asakura ............... B62D 5/0424

* cited by examiner

BALL SCREW DEVICE AND STEERING DEVICE

CROSS REFERENCE TO RELATED APPLICATIONS

This application claims priority based on Japanese Patent Application No. 2017-213901 filed on Nov. 6, 2017 and Japanese Patent Application No. 2017-213902 filed on Nov. 6, 2017, the entire contents of which are incorporated by reference herein.

BACKGROUND OF THE INVENTION

Technical Field

The present invention relates to a ball screw device and a steering device.

Background Art

A deflector-type ball screw device has been hitherto known (for example, see JP-A-2015-45394, JP-A-2010-71411). The ball screw device is a device used for a steering device and the like that steers wheels to be steered of a vehicle. The ball screw device described in JP-A-2015-45394 and JP-A-2010-71411 includes a ball screw shaft and a ball screw nut. The ball screw shaft is a rack shaft extending in a vehicle width direction and changing the direction of the steered wheels by movement in the vehicle width direction. Outer-peripheral rolling grooves are formed in a spiral manner on an outer peripheral surface of the ball screw shaft. The ball screw nut is arranged on the same axis on an outer side in a radial direction with respect to the ball screw shaft, which is formed in a cylindrical shape so as to rotate relatively with respect to the ball screw shaft. Inner-peripheral rolling grooves are formed in a spiral manner on an inner peripheral surface of the ball screw nut. A rolling path where balls can roll and which is surrounded by the outer-peripheral rolling grooves of the ball screw shaft and the inner-peripheral rolling grooves of the ball screw nut is formed between the ball screw shaft and the ball screw nut.

The ball screw nut includes a nut main body and deflectors. At least part of the inner-peripheral rolling grooves is formed in the nut main body. The nut main body is also provided with deflector mounting holes piercing in the radial direction at two places apart from each other in an axial direction. A circulation path extending in the axial direction and where balls can roll is formed between the deflector mounting holes of two places in the nut main body. Two deflectors are provided so as to correspond to the deflector mounting holes of two places. Two deflectors are respectively inserted into corresponding deflector mounting holes from the outer side in the radial direction and fixed thereto. A passage allowing the rolling path to communicate with the circulation path of the nut main body is formed in each deflector. The passage of the deflector is a path where balls are allowed to pass between the rolling path and the circulation path in a state where the deflector is fixed to the deflector mounting hole. On end of the passing path of the deflector opens to a side surface of the ball screw nut facing in the axial direction and is connected to the circulation path of the nut main body.

Incidentally, when the deflector of the ball screw nut is assembled to the nut main body as described above, it is necessary to insert the deflector into the deflector mounting hole formed in the nut main body from the outer side in the radial direction. After the deflector is inserted into the deflector mounting hole of the nut main body and housed in a desired position, there is a case where a contact portion between the deflector and the nut main body is worn down. For example, in a structure in which the deflector is press-fitted into the deflector mounting hole, an interference at a press-fitting portion of the deflector is gradually reduced with lapse of time in a case where the deflector is made of a material which can be easily molded (such as zinc). When such abrasion occurs, the deflector inserted into the deflector mounting hole easily moves to the outer side in the radial direction with respect to the nut main body. On the outer side in the radiation direction of the ball screw nut, opposite components such as a ball bearing and a pulley are arranged. If there is a clearance between the ball screw nut and the opposite components, there is a possibility that the deflector comes off from the deflector mounting hole by the clearance to the outer side in the radial direction.

In order to roll the balls in the passage of the deflector and the circulation path of the nut main body smoothly, it is necessary that an opening width of a connection portion between the passage of the deflector and the circulation path of the nut main body is equal to or larger than a diameter of the ball. However, the passage of the deflector and the circulation path of the nut main body are displaced in the radial direction when the deflector comes off from the deflector mounting hole to the outer side in the radial direction as described above. Therefore, when both an opening width of the passage of the deflector and an opening width of the circulation path of the nut main body are set to be equivalent to the diameter of the ball, a level difference occurs between the paths at the above connection portion and the width of the paths where the balls roll is partially reduced, which may cause ball clogging.

On the other hand, in order to prevent the occurrence of ball clogging, it is considered that at least any one of a path width in the entire range of the passage of the deflector and a path width in the entire range of the circulation path of the nut main body is formed to be larger than the ball diameter by the size of the clearance so that the width of the path where the balls roll in the connection portion is secured to be equal to or larger than the ball diameter even when the deflector comes off from the deflector mounting hole to the outer side in the radial direction. However, the path width in the entire range of the passage of the deflector or the path width in the entire range of the circulation path of the nut main body is larger than the ball diameter by the size of the clearance, therefore, a plurality of balls are arranged zigzag without being aligned in series in the passage or the circulation path and circulation of balls is not performed smoothly.

SUMMARY OF THE INVENTION

The present invention has been made in view of the above points and an object thereof is to provide a ball screw device and a steering device capable of securing smooth circulation of balls while suppressing occurrence of ball clogging caused by displacement in the radial direction between the deflector and the nut main body.

A ball screw device according to the present invention includes a ball screw shaft having outer-peripheral rolling grooves formed in a spiral manner on an outer peripheral surface, a ball screw nut arranged on the same axis on an outer side in a radial direction with respect to the ball screw shaft and formed in a cylindrical shape so as to rotate relatively with respect to the ball screw shaft, in which inner-peripheral rolling grooves are formed in a spiral manner on an inner peripheral surface, balls capable of rolling in a rolling path surrounded by the outer-peripheral rolling grooves and the inner-peripheral rolling grooves and a circulation path allowing one end of the rolling path to communicate with the other end thereof to circulate the balls endlessly. The ball screw nut includes a nut main body in which at least part of the inner-peripheral rolling grooves and at least part of the circulation path are respectively formed and a deflector mounting hole piercing in the radial direction is provided, and a deflector inserted into the deflector mounting hole from the outer side in the radial direction and fixed thereto, in which a passage allowing the inner-peripheral rolling grooves of the nut main body to communicate with the circulation path to allow the balls to pass therethrough is formed and an open groove allowing the passage to open to a side surface of the circulation path side is formed. At least one of the nut main body and the deflector has an inclined portion provided at a peripheral part of a connection portion where the circulation path of the nut main body and the passage of the deflector are connected to each other, the inclined portion which secures passing of the balls at the connection portion when an insertion position of the deflector with respect to the deflector mounting hole is displaced from a desired position within a range of a given distance.

According to the structure, even when the insertion position of the deflector with respect to the deflector mounting hole is displaced from the desired position to the outer side in the radial direction within the range of the given distance, the passing of balls at the connection portion between the passage of the deflector and the circulation path of the nut main body portion is secured by the inclined portion. Accordingly, clogging of balls in the vicinity of the connection portion can be suppressed if displacement of the insertion position of the deflector occurs. It is not necessary to increase a path width itself to be larger than a diameter of the ball within the range of the given distance over the entire region of the passage of the deflector for suppressing occurrence of clogging of balls. Accordingly, it is just necessary to set a path width not including the inclined portion of the passage to be the same as the diameter of the ball or to be slightly larger than the diameter, therefore, it is possible to suppress a plurality of balls being arranged zigzag inside the passage of the deflector. Accordingly, smooth circulation of balls can be secured while suppressing occurrence of clogging of balls caused by displacement in the radial direction between the deflector and the nut main body of the ball screw nut.

A steering device according to the present invention includes the above ball screw device. According to the structure, it is possible to realize the steering device capable of securing smooth circulation of balls while suppressing occurrence of clogging of balls caused by displacement in the radial direction between the deflector and the nut main body in the ball screw nut.

DETAILED DESCRIPTION OF INVENTION

A structure of a steering device having a ball screw device according to an embodiment of the present invention will be explained with reference to FIG. 1 to FIG. 13.

The steering device is a device that moves a rack shaft as a steering shaft along an axial direction in which the rack shaft extends to thereby steer wheels to be steered respectively connected to both ends of the rack shaft. A steering device 1 is capable of assisting a steering torque of a driver by an auxiliary torque. The ball screw device may be applied to a four-wheel steering device, a rear-wheel steering device, a steer-by-wire device and so on.

(1. Structure of Steering Device)

Figure 1:
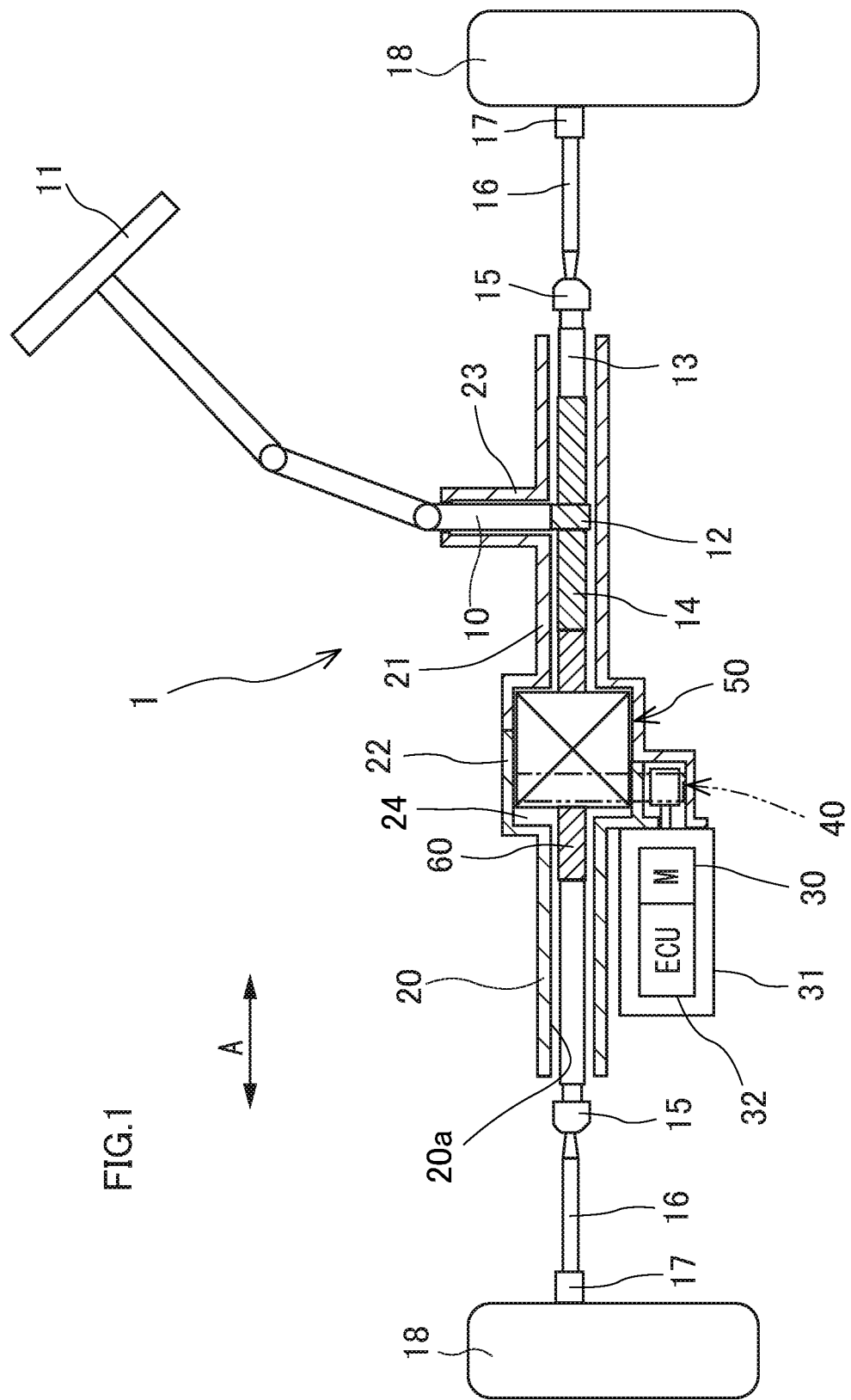
FIG. 1 is an entire structure view of a steering device according to an embodiment of the present invention.

The steering device 1 according to the embodiment includes a steering shaft 10 as shown in FIG. 1. A steering wheel 11 which can be operated to rotate by a vehicle driver is connected to one end portion of the steering shaft 10. The steering shaft 10 is rotatably held by a rack housing 20 supported in a vehicle body, rotating in accordance with rotation of the steering wheel 11. A pinion 12 forming a rack and pinion mechanism is formed at the other end portion of the steering shaft 10.

The steering device 1 includes a rack shaft 13 as a turning shaft extending in a vehicle width direction, namely, in an axial direction A. A rack 14 forming the rack and pinion mechanism with the pinion 12 is formed at a place deviated to either one end of the rack shaft 13. The pinion 12 of the steering shaft 10 and the rack 14 of the rack shaft 13 are engaged with each other. The steering shaft 10 transmits a torque added to the steering wheel 11 by the rotation operation (namely, steering operation) by the vehicle driver to the rack shaft 13. The rotation of the steering shaft 10 is converted into a straight line movement of the rack shaft 13 in the axial direction A by the rack and pinion mechanism. The rack shaft 13 moves in the axial direction A with the rotation of the steering shaft 10.

Tie rods 16 are connected to both end portions in the axial direction of the rack shaft 13 so as to swing through ball joints 15. Steered wheels 18 are connected to the tie rods 16 through knuckle arms 17. The steered wheels 18 are steered to be turned by movement of the rack shaft 13 in the axial direction A. The vehicle is steered right and left by the turning of the steered wheels.

The steering device 1 is capable of generating the auxiliary torque assisting the steering torque at the time of operating the steering wheel 11 to rotate by the vehicle operator using an electric motor as a drive source. The steering device 1 includes an electric motor 30, a driving force transmitting device 40 and a ball screw device 50. The steering device 1 transmits the auxiliary torque generated by the electric motor 30 to the ball screw device 50 as a gear device through the driving force transmitting device 40 as well as converts the torque into a force allowing the rack shaft 13 to move straight in the axial direction A by the ball screw device 50. According to the conversion, the auxiliary torque assisting the turning of the steered wheels 18 is given to the rack shaft 13. The steering device 1 is a so-called rack-parallel type electric power steering device.

The rack housing 20 is a housing formed in an approximately cylindrical shape extending in the axial direction A, covering and holding the rack shaft 13 so as to move in the axial direction A. The rack housing 20 has an insertion hole 20a through which the rack shaft 13 is inserted. The rack shaft 13 is inserted into the rack housing 20 and held therein so as to move in the axial direction A. The rack housing 20 is formed of aluminum or the like. The rack housing 20 has a small-diameter portion 21 having an inner diameter slightly larger than an outer diameter of the rack shaft 13 and a large-diameter portion 22 having an inner diameter larger than the inner diameter of the small-diameter portion 21.

A steering shaft insertion portion 23 into which the steering shaft 10 is inserted is integrally formed with the small-diameter portion 21. The driving force transmitting device 40 and the ball screw device 50 are housed in the large-diameter portion 22. In the large-diameter portion 22, a ball screw chamber 24 mainly containing a later-described ball screw nut and rolling balls (corresponding to balls) is formed. The large-diameter portion 22 is arranged in approximately the central part in the axial direction of the rack housing 20. The rack housing 20 may be separated in the axial direction A so as to easily house the ball screw nut of the ball screw device 50 and the driving force transmitting device 40 in the large-diameter portion 22.

The electric motor 30 is housed in a case 31 fixed close to the large-diameter portion 22 of the rack housing 20. The electric motor 30 is housed so that an output shaft thereof is in parallel to the axial direction A of the rack shaft 13. The electric motor 30 is electrically connected to an electronic control device (ECU) 32. The ECU 32 calculates the auxiliary torque to be generated by the electric motor 30 based on a torsion amount corresponding to the steering torque of the steering shaft 10 and instructs the electric motor 30 to generate the auxiliary torque. The electric motor 30 generates the auxiliary torque in accordance with the instruction from the ECU 32. The auxiliary torque generated by the electric motor 30 is transmitted to the driving force transmitting device 40.

Figure 2:
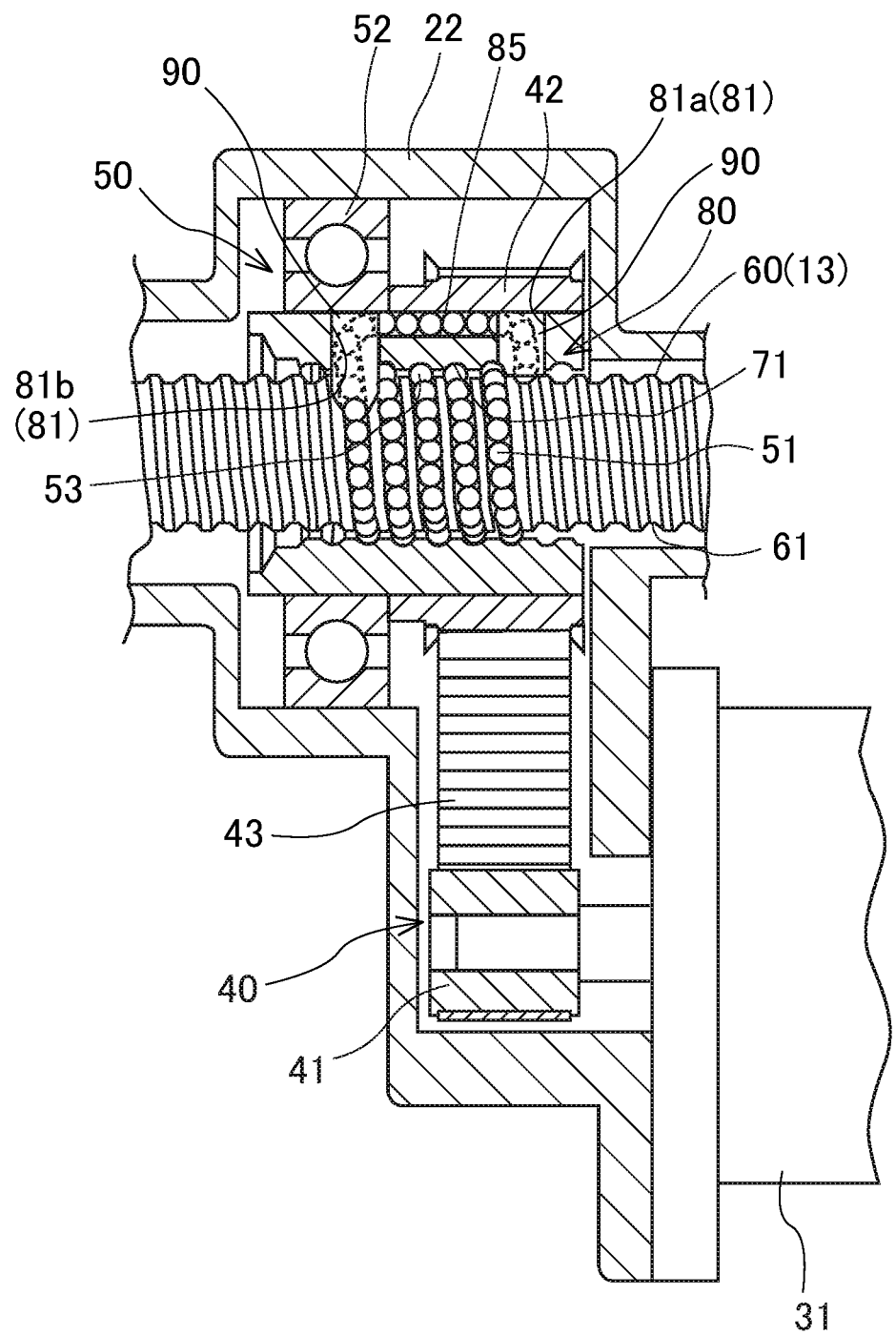
FIG. 2 is a cross-sectional view of a part including a ball screw device included in the steering device according to the embodiment.

The driving force transmitting device 40 has a drive pulley 41, a driven pulley 42 and a toothed belt 43 as shown in FIG. 2. The drive pulley 41 is attached and fixed to the output shaft of the electric motor 30. The drive pulley 41 is formed to have outer teeth. The driven pulley 42 is attached and fixed to a later-described ball screw nut of the ball screw device 50. The driven pulley 42 is formed to have outer teeth. The toothed belt 43 is formed in a belt shape and an annular shape. The toothed belt 43 has inner teeth which can be engaged with the outer teeth of the drive pulley 41 and the outer teeth of the driven pulley 42. The driving force transmitting device 40 transmits the auxiliary torque generated by the electric motor 30 from the drive pulley 41 to the driven pulley 42 through the toothed belt 43.

When the auxiliary torque is transmitted from the electric motor 30 to the driving force transmitting device 40, the ball screw nut of the ball screw device 50 is driven to rotate while being supported with respect to the large-diameter portion 22 of the rack housing 20 through the later-described ball bearing, thereby moving the rack shaft 13 in the axial direction A through a plurality of rolling balls.

When the steering wheel 1 is operated to rotate in the above steering device 1, the steering torque is transmitted to the steering shaft 10 and the rack shaft 13 is moved in the axial direction A through the rack and pinion mechanism including the pinion 12 and the rack 14. An input torque inputted to the steering shaft 10 is detected by using a torque sensor and the like. The output of the electric motor 30 is controlled based on the input torque of the steering shaft 10, a rotation position of the electric motor 30 and the like. The electric motor 30 generates the auxiliary torque in accordance with the instruction from the ECU 32. When the electric motor 30 generates the auxiliary torque, the auxiliary torque is transmitted to the ball screw device 50 through the driving force transmitting device 40 and is converted into a driving force for moving the rack shaft 13 in the axial direction A.

When the rack shaft 13 is moved in the axial direction A, the direction of the steered wheels 18 is changed through the ball joints 15, the tie rods 16 and the knuckle arms 17. Therefore, the steering torque to the steering shaft 10 by the driver and the auxiliary torque by the electric motor 30 in accordance with the steering torque are given to the rack shaft 13 to thereby move the rack shaft 13 in the axial direction A according to the steering device 1, therefore, a steering force necessary for the driver to operate the steering wheel 11 can be reduced.

(2. Structure of Ball Screw Device)

The ball screw device 50 incudes a ball screw shaft 60, a ball screw nut 70 and rolling balls 51 (corresponding to balls). The ball screw shaft 60 indicates a portion where a ball screw portion is provided in the rack shaft 13. Outer-peripheral rolling grooves 61 are formed in a spiral manner on an outer peripheral surface of the ball screw shaft 60. The outer-peripheral rolling grooves 61 are grooves a cross-sectional shape of which is an approximately semicircular shape. The outer-peripheral rolling grooves 61 extend in a spiral manner in a state of being wound plural times on the outer peripheral surface of the ball screw shaft 60 around the axial center of the ball screw shaft 60. The outer-peripheral rolling grooves 61 are provided at a position different from a position of the rack shaft 14.

The ball screw nut 70 is a cylindrical member formed in a cylindrical shape so as to extend in the axial direction A, which is arranged in the same axis as the rack shaft 13. One end side (left side in FIG. 2) in the axial direction A of the ball screw nut 70 is rotatably supported on an inner peripheral surface of the large-diameter portion 22 of the rack housing 20 through a ball bearing 52. The driven pulley 42 is attached and fixed to the other end side (right side in FIG. 2) in the axial direction A of the ball screw nut 70.

Inner-peripheral rolling grooves 71 are formed in a spiral manner on an inner peripheral surface of the ball screw nut 70. The inner-peripheral rolling grooves 71 are grooves a cross-sectional shape of which is a semicircular shape. The inner-peripheral rolling grooves 71 extend in a spiral manner in a state of being wound plural times on an inner peripheral surface of the ball screw nut 70 around the axial center of the ball screw nut 70. The outer-peripheral rolling grooves 61 of the ball screw shaft 60 and the inner-peripheral rolling grooves 71 of the ball screw nut 70 are arranged so as to face each other in a radial direction R. A rolling path 53 surrounded by the outer-peripheral rolling grooves 61 and the inner-peripheral rolling grooves 71 is formed so as to extend in a circumferential direction between the outer-peripheral rolling grooves 61 and the inner-peripheral rolling grooves 71. The rolling path 53 is formed so that rolling balls 51 can roll. In the rolling path 53, a plurality of rolling balls 51 are arranged. The outer-peripheral rolling grooves 61 of the ball screw shaft 60 and the inner-peripheral rolling grooves 71 of the ball screw nut 70 are engaged through the plural rolling balls 51.

Figure 3:
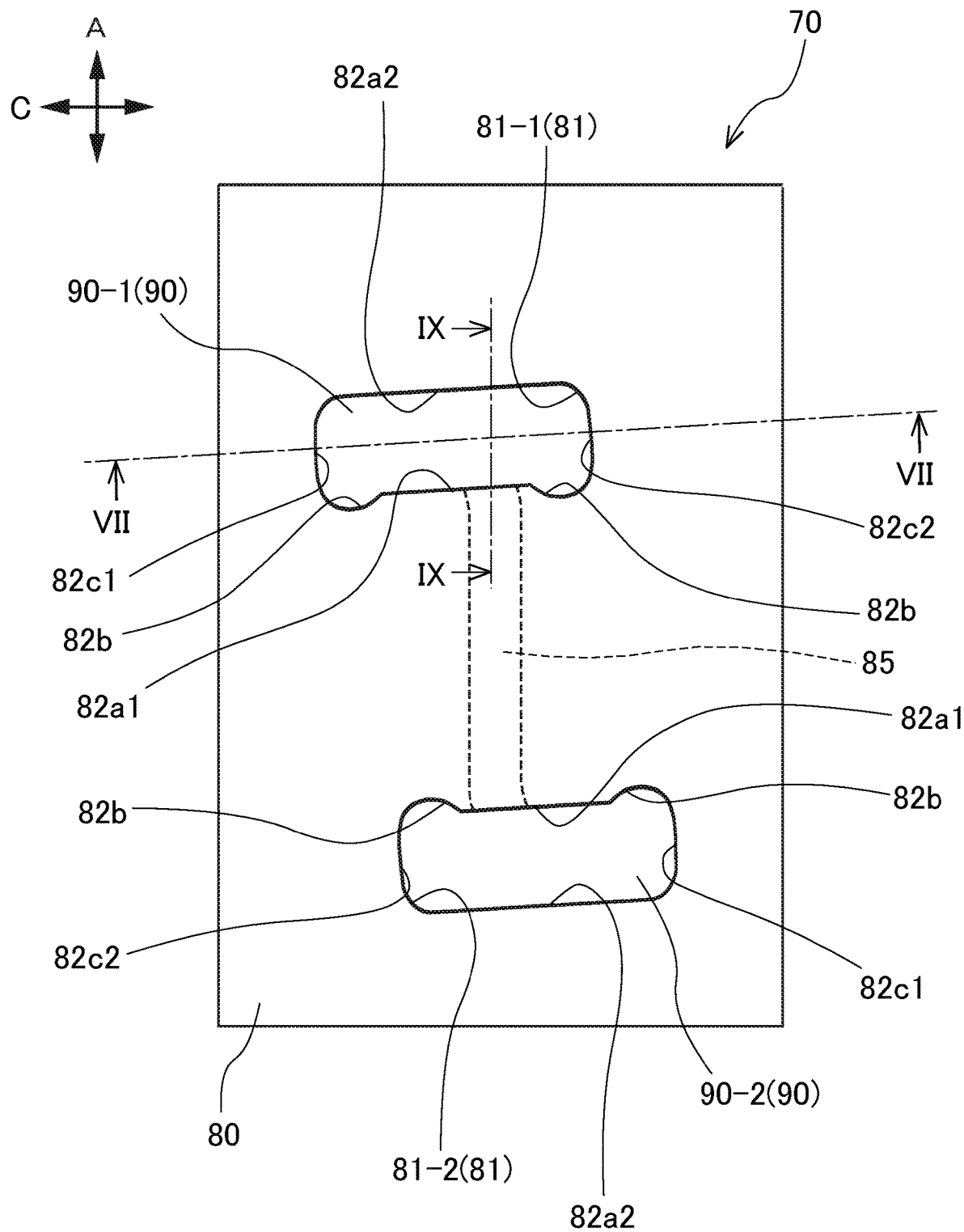
FIG. 3 is a view of a ball screw nut included in the ball screw device according to the embodiment seen from an outer side in a radial direction.

The ball screw nut 70 includes a nut main body 80 and deflectors 90 as shown in FIG. 3. The nut main body 80 is a portion forming a main body of the cylindrical ball screw nut 70. At least part (most part) of the inner-peripheral rolling grooves 71 of the ball screw nut 70 is formed on an inner peripheral surface of the nut main body 80.

Figure 4:
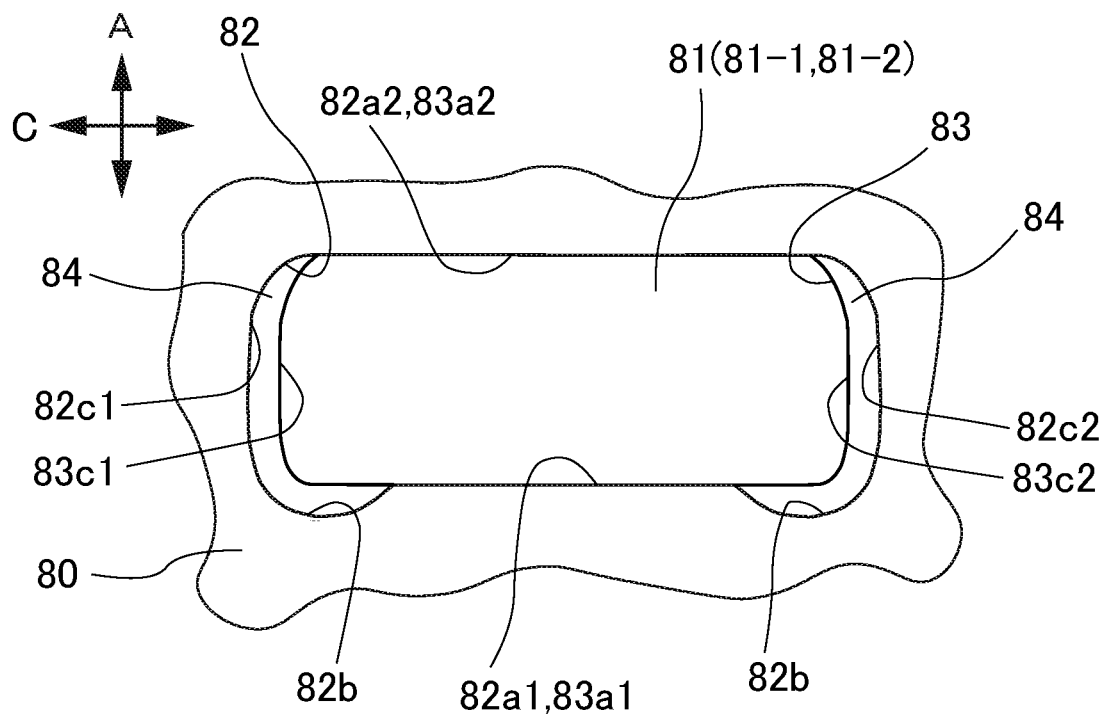
FIG. 4 is a view of a deflector mounting hole included in the ball screw nut according to the embodiment seen from the outer side in a radial direction.

The nut main body 80 has deflector mounting holes 81 as shown in FIG. 3 and FIG. 4. The deflector mounting holes 81 are through holes piercing in the radial direction R between the outer peripheral surface of the nut main body 80 and the inner peripheral surface where the inner-peripheral rolling grooves 71 are formed. The deflector mounting holes 81 are mounting holes for mounting and fixing (specifically, press-fitting) the deflectors 90 in the nut main body 80. The deflectors 90 are inserted into the deflector mounting holes 81 from an outer side in the radial direction of the nut main body 80 and press-fitted into the nut main body 80. Hereinafter, an insertion direction of the deflectors 90 into the deflector mounting holes 81 is referred to as an insertion direction D (see FIG. 7).

The deflector mounting holes 81 are provided at two places in the nut main body 80. The deflector mounting holes at two places will be appropriately referred to as deflector mounting holes 81-1 and 81-2 in the following description. A pair of deflector mounting holes 81-1 and 81-2 are arranged at a given interval apart from each other in the axial direction A. The given interval in the axial direction A between the pair of deflector mounting holes 81-1 and 81-2 is a distance necessary for striding over given plural rows of the inner-peripheral rolling grooves 71 formed in the spiral manner in the nut main body 80.

The deflector mounting holes 81-1 and 81-2 are respectively formed so as to extend in a circumferential direction C of the nut main body 80. Each of the deflector mounting holes 81-1 and 81-2 includes a press-fitting hole portion 82, a guide hole portion 83 and supporting surfaces 84. The press-fitting hole portion 82 is formed on the outer peripheral surface side in the radial direction R of the ball screw nut 70. The guide hole portion 83 is formed on an inner peripheral surface side in the radial direction R of the ball screw nut 70, which is formed on an inner side in the radial direction with respect to the press-fitting hole portion 82. The supporting surfaces 84 are surfaces formed on a stepped portion between the press-fitting hole portion 82 and the guide hole portion 83.

The press-fitting hole portion 82 is a portion for press-fitting and fixing a later-described outer peripheral portion of the deflector 90. The press-fitting hole portion 82 is formed so that a cross-sectional shape orthogonal to the insertion direction D of the deflector 90 is an approximately rectangular shape with curved surfaces at corner portions so as to correspond to a shape of the outer peripheral portion of the deflector 90. The press-fitting portion 82 includes a pair of axial direction side surfaces 82a1, 82a2 facing each other in parallel in the axial direction A and a pair of circumferential direction side surfaces 82c1, 82c2 facing each other in parallel in the circumferential direction C. The axial direction side surfaces 82a1, 82a2 are formed so as to extend in a flat surface shape or in a curved surface shape in a plane including both the circumferential direction C and the radial direction R. The circumferential direction side surfaces 82c1, 82c2 are formed so as to extend in the flat surface shape or in the curved surface shape in a plane including both the axial direction A and the radial direction R. The axial direction side surfaces 82a1, 82a2 and the circumferential direction side surfaces 82c1, 82c2 are orthogonal to each other, which are connected so as to cross each other at corner end portions to form curved surfaces.

The axial direction side surface 82a1 on one side has recessed portions 82b recessed in the axial direction A. The recessed portions 82b are respectively provided at both end portions in the circumferential direction C of the axial direction side surface 82a1. Note that the recessed portions 82b may be provided on the axial direction side surface 82a2 on the other side. However, it is desirable that the recessed portions 82b are provided so as to be asymmetrical in the axial direction side surface 82a1 and the axial direction side surface 82a2 for preventing assembly error and the like of the deflector 90.

Each of the recessed portions 82b is formed in a groove shape (for example, a semi-cylindrical shape) so as to extend in the radial direction R, namely, in the insertion direction D of the deflector 90 as well as so that an inner surface is a curved surface in the circumferential direction C. The recessed portions 82b open to an outer peripheral surface of the nut body portion 80 and extend from the outer peripheral surface to a given depth in the insertion direction D. The recessed portions 82b are formed so as to be engaged with later-described protruding portions of the deflector 90 and so as to guide the protruding portions toward the insertion direction D. The axial direction side surface 82a1 in which the recessed portions 82b are formed may be a surface continued from the circumferential direction side surfaces 82c1, 82c2 so as to be integrated with these circumferential direction side surfaces 82c1, 82c2.

The guide hole portion 83 is a portion for housing a later-described inner peripheral portion of the deflector 90. The guide hole portion 83 is formed so that a cross-sectional shape orthogonal to the insertion direction D of the deflector 90 is an approximately rectangular shape with curved surfaces at corner portions so as to correspond to a shape of the inner peripheral portion of the deflector 90. The guide hole portion 83 is forms so that a hole width in the axial direction A approximately corresponds to a hole width in the axial direction A of the press-fitting hole portion 82 as well as a hole width in the circumferential direction C is smaller than a hole width in the circumferential direction of the press-fitting hole portion 82.

The guide hole portion 83 includes a pair of axial direction side surfaces 83a1, 83a2 facing each other in parallel in the axial direction A and a pair of circumferential direction side surfaces 83c1, 83c2 facing each other in parallel in the circumferential direction C. The axial direction side surfaces 83a1, 83a2 are formed so as to extend in the flat surface shape or in the curved surface shape in a plane including both the circumferential direction C and the radial direction R, forming the same plane with respect to the axial direction side surfaces 82a1, 82a2 of the press-fitting hole portion 82 without a step. The circumferential direction side surfaces 83c1, 83c2 are formed so as to extend in the flat surface shape or in the curved surface shape in a plane including both the axial direction A and the radial direction R. The axial direction side surfaces 83a1, 83a2 and the circumferential direction side surfaces 83c1, 83c2 are orthogonal to each other, which are connected so as to cross each other at corner end portions to form curved surfaces.

The supporting surfaces 84 are surfaces for positioning the deflector 90 inserted into the deflector mounting hole 81 in the insertion direction D. The supporting surface 84 is a surface formed in a stepped portion positioning at an interface between the circumferential direction side surface 82c1 of the press-fitting hole portion 82 and the circumferential direction side surface 83c1 of the guide hole portion 83, a normal line of which is directed to the outer side in the radial direction. The support surfaces 84 are provided on both sides in the circumferential direction C of the deflector mounting hole 81 respectively. The support surfaces 84 may include bottom surfaces of the recessed portions 82b.

The nut main body 80 also includes a circulation path 85. The circulation path 85 is a path provided between the pair of deflector mounting holes 81-1 and 81-2. The circulation path 85 extends along a direction approximately corresponding to the axial direction A of the ball screw nut 70. The circulation path 85 is formed in a tunnel shape so as to pierce through the nut main body 80 between the deflector mounting holes 81-1 and 81-2. That is, one end of the circulation path 85 opens to the axial direction side surfaces 82a1, 83a1 of the deflector mounting hole 81-1 and the other end of the circulation path 85 opens to the axial direction side surfaces 82a1, 83a1 of the deflector mounting hole 81-2. The circulation path 85 is formed to have the same path width as a diameter (=2S) of the rolling ball 51 or to have a path width (inner diameter) slightly larger than the diameter 2S.

Figure 5:
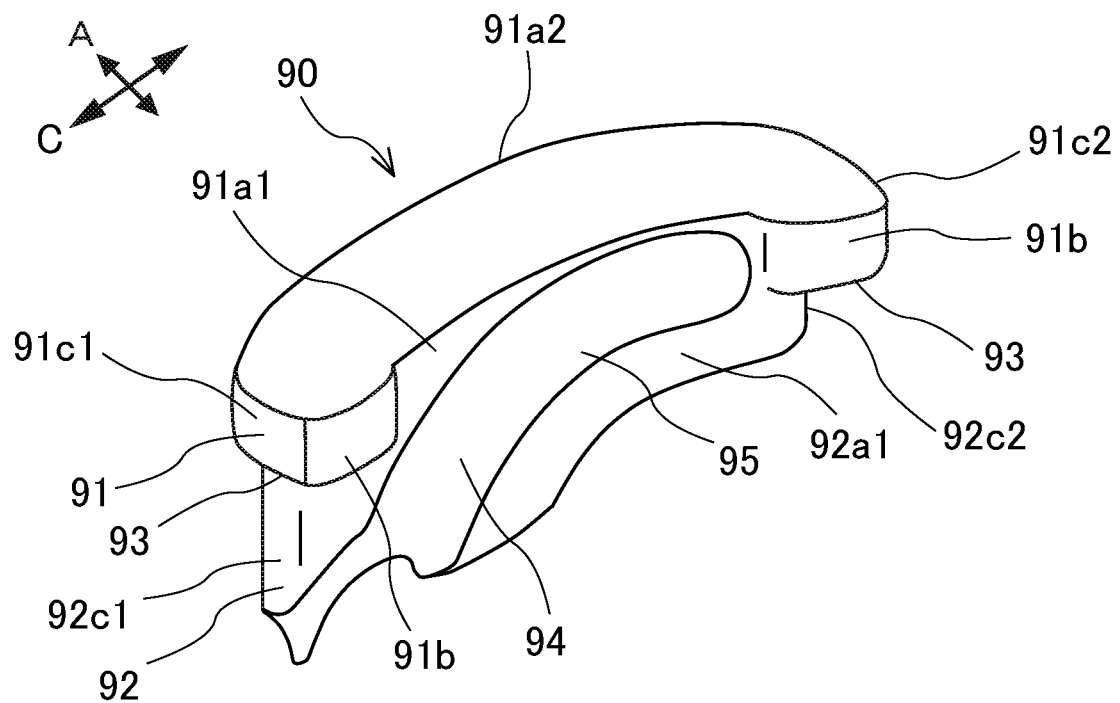
FIG. 5 is a perspective view of a deflector included in the ball screw nut according to the embodiment.

The deflector 90 is a piece member inserted into the deflector mounting hole 81 of the nut main body 80 and fixed thereto. In the following description, directions described in explanation of the deflector 90 are the same directions as the axial direction A, the radial direction R and the circumferential direction C of the nut main body 80 of the ball screw nut 70. The deflector 90 is an open-groove type deflector as shown in FIG. 5, which can be easily manufactured. The deflector 90 is formed of a metal material (for example, a metal such as zinc) which is softer than the material of the nut main body 80. The deflector 90 is molded by pouring molten metal into a metallic mold by, for example, a die casting method. Two deflectors 90 are provided so as to correspond to the deflector mounting holes 81 at two places (see FIG. 3). In the following description, the deflector inserted into the deflector mounting hole 81-1 is appropriately referred to as a deflector 90-1 and the deflector inserted into the deflector mounting hole 81-2 is referred to as a deflector 90-2 in the two deflectors 90.

The deflector 90 includes an outer peripheral portion 91 corresponding to the press-fitting hole portion 82 of the deflector mounting hole 81 and an inner peripheral portion 92 corresponding to the guide hole portion 83 of the deflector mounting hole 81. The outer peripheral portion 91 is formed so that a cross-sectional shape orthogonal to the insertion direction D of the deflector 90 is an approximately rectangular shape with curved surfaces at corner portions so as to correspond to the shape of the press-fitting hole portion 82. The inner peripheral portion 92 is formed so that a cross-sectional shape orthogonal to the insertion direction D of the deflector 90 is an approximately rectangular shape with curved surfaces at corner portions so as to correspond to the shape of the guide hole portion 83.

The outer peripheral portion 91 includes a pair of axial direction side surfaces 91a1, 91a2 facing each other in parallel in the axial direction A and a pair of circumferential direction side surfaces 91c1, 91c2 facing each other in parallel in the circumferential direction C. The axial direction side surfaces 91a1, 91a2 are formed so as to extend in the flat surface shape or in the curved surface shape in a plane including both the circumferential direction C and the radial direction R. The circumferential direction side surfaces 91c1, 91c2 are formed so as to extend in the flat surface shape or in the curved surface shape in a plane including both the axial direction A and the radial direction R. The axial direction side surfaces 91a1, 91a2 and the circumferential direction side surfaces 91c1, 91c2 are orthogonal to each other, which are connected so as to cross each other at corner end portions to form curved surfaces.

The axial direction side surfaces 91a1, 91a2 of the outer peripheral portion 91 face the axial direction side surfaces 82a1, 82a2 of the press-fitting hole portion 82 and the circumferential direction side surfaces 91c1, 91c2 face the circumferential direction side surfaces 82c1, 82c2 of the press-fitting hole portions 82 in a state where the deflector 90 is housed in the deflector mounting hole 81.

The axial direction side surface 91a1 on one side has protruding portions 91b protruding in the axial direction A, which are formed to have a shape paired with the shape of the recessed portions 82b of the press fitting hole portion 82. The protruding portions 91b are provided at both end portions in the circumferential direction C of the axial direction side surface 91a1 respectively. In the structure in which the recessed portions 82b are provided also in the axial direction side surface 82a2 on the other side of the press-fitting hole portion 82, the protruding portions 91b are provided also in the axial direction side surface 91a2 on the other side. The protruding portions 91b are formed to have a protruding shape (for example, a semi-cylindrical shape) so as to extend in the radial direction R, namely, the insertion direction D of the deflector 90 and so that outer surfaces are curved surface in the circumferential direction C. The protruding portions 91b extend from the outer peripheral surface of the deflector 90 to a depth where the protruding portions 91b abut on the supporting surfaces 84 of the nut main body 80 in the insertion direction D. Outer surfaces (namely, end surfaces in the axial direction) of the protruding portions 91b are formed so as to be engaged with as well as to be guided to the inner surfaces (namely, end surfaces in the axial direction) of the recessed portions 82b of the press-fitting hole portion 82 in the deflector mounting hole 81.

The inner peripheral portion 92 is formed so that a width Wi in the axial direction A is smaller than a width Wo in the axial direction A of the outer peripheral portion 91 as well as so that a width in the circumferential direction C is smaller than a width in the circumferential direction C of the outer peripheral portion 91. The inner peripheral portion 92 includes a pair of axial direction side surfaces 92a1, 92a2 facing each other in parallel in the axial direction A and a pair of circumferential direction side surfaces 92c1, 92c2 facing each other in parallel in the circumferential direction C. The axial direction side surfaces 92a1, 92a2 are formed so as to extend in the flat surface shape or in the curved surface shape in a plane including both the circumferential direction C and the radial direction R, forming the same plane with respect to the axial direction side surfaces 91a1, 91a2 of the outer peripheral portion 91 without a step other than the above-described protruding portions 91b. The circumferential direction side surfaces 92c1, 92c2 are formed so as to extend in the flat surface shape or in the curved surface shape in a plane including both the axial direction A and the radial direction R. The axial direction side surfaces 92a1, 92a2 and the circumferential direction side surfaces 92c1, 92c2 are orthogonal to each other, which are connected so as to cross each other at corner end portions to form curved surfaces.

The axial direction side surfaces 92a1, 92a2 of the inner peripheral portion 92 face the axial direction side surfaces 83a1, 83a2 of the guide hole portion 83 and the circumferential direction side surfaces 92c1, 92c2 face the circumferential direction side surfaces 83c1, 83c2 of the guide hole portion 83 in the state where the deflector 90 is housed in the deflector mounting hole 81.

The deflector 90 also includes supported surfaces 93 formed at stepped portions positioning at interfaces between the outer peripheral portion 91 (specifically, the circumferential side surfaces 91c1, 91c2) and the inner peripheral portion 92 (specifically, the circumferential side surfaces 92c1, 92c2). The supported surfaces 93 are surfaces normal lines of which are directed to the inner side in the radial direction. The supported surfaces 93 are surfaces abutting on the supporting surfaces 84 of the nut main body 80 to regulate the position in the insertion direction D of the deflector 90 when the deflector is inserted into the deflector mounting hole 81.

In the deflector 90, a passage 94 through which rolling balls 51 can pass is formed. The passage 94 is a communication passage allowing the inner-peripheral rolling groove 71 to communicate with the circulation path 85 of the nut main body 80 to allow the rolling balls 51 to pass between the rolling path 53 and the circulation path 85. One end of the passage 94 opens to an inner surface in the radial direction of the deflector 90. The other end of the passage 94 opens to the axial direction side surface of the deflector 90 (specifically, the axial direction side surface 91a1 of the outer peripheral portion 91 and the axial direction side surface 92a1 of the inner peripheral portion 92). The passage 94 is formed to have the same path width as the diameter 2S of the rolling balls 51 or a slightly larger path width than the diameter 2S.

The passage 94 is formed to extend while curving or bending so as to pass the rolling balls 51 smoothly between the rolling path 53 and the circulation path 85 in the deflector 90. Specifically, a part close to a connection portion 96 with respect to the rolling path 53 in the passage 94 is formed so as to extend to the outer side in the radial direction while extending along the circumferential direction in which the spiral-shaped rolling path 53 existing in the inner side in the radial direction of the ball screw nut 70 extends. Apart close to a connection portion 97 with respect to the circulation path 85 in the passage 94 is formed so as to extend along the axial direction A in which the circulation path 85 extends. The passage 94 curves or bends so as to connect the connection portions 96 and 97 of both ends to each other in the deflector 90.

Figure 6:
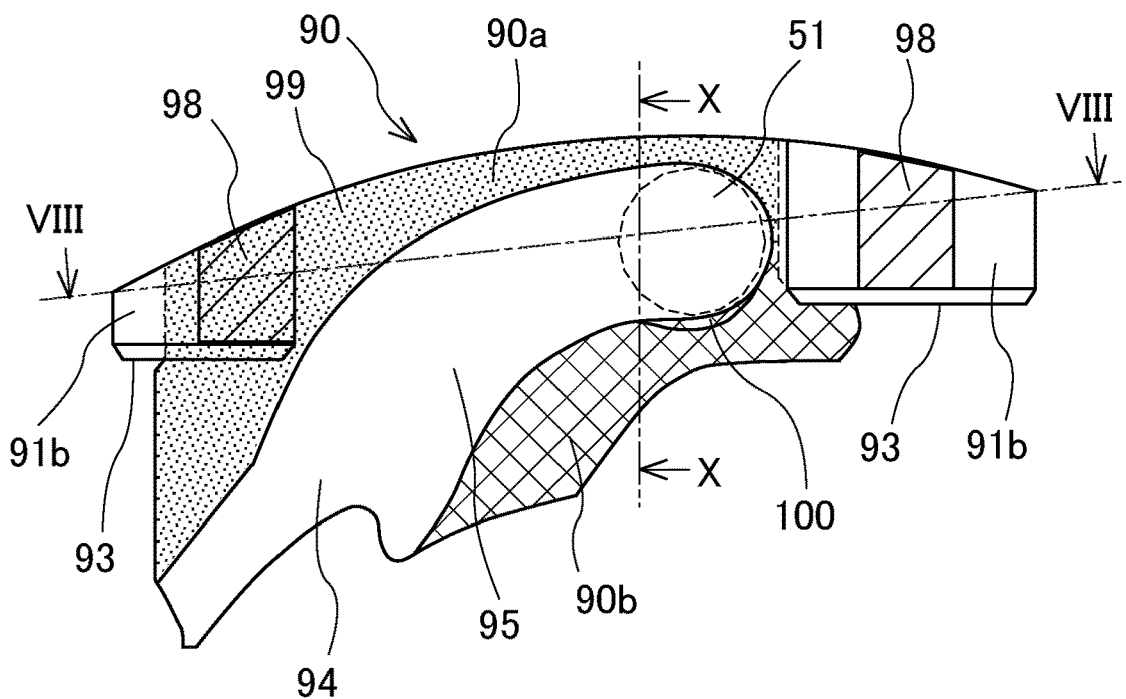
FIG. 6 is a side view of the deflector according to the embodiment.
Figure 7:
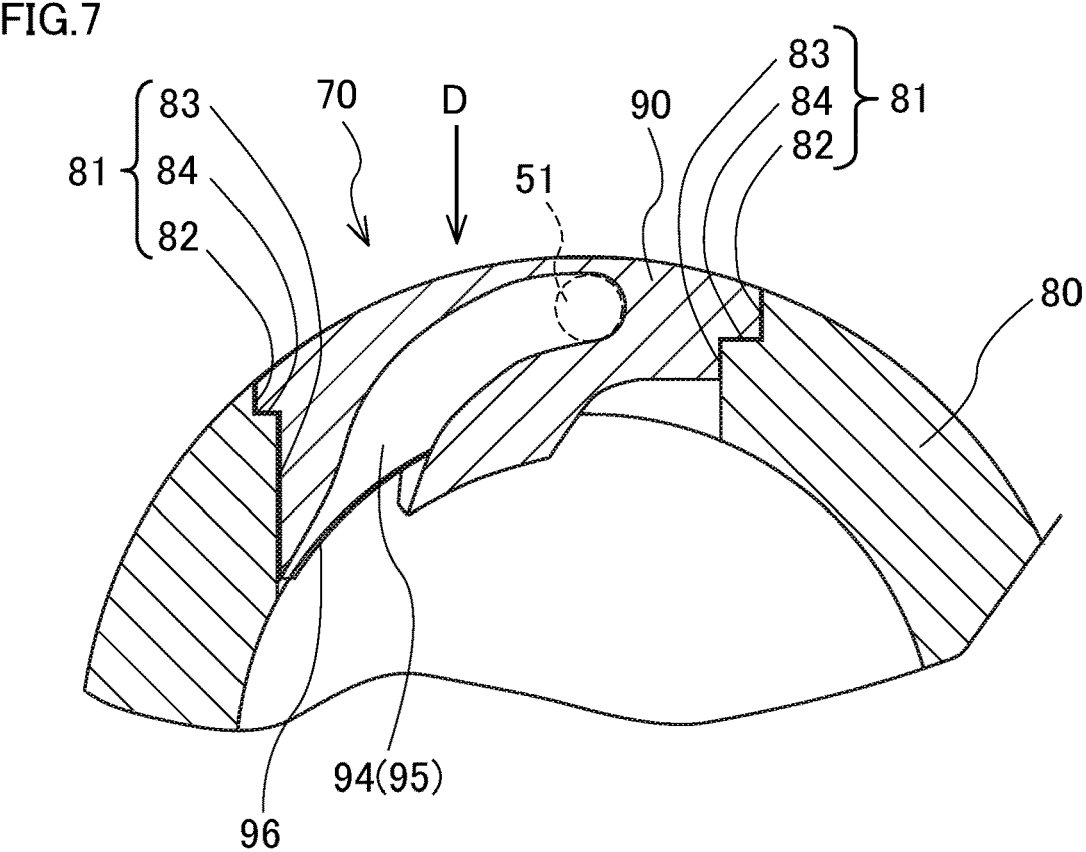
FIG. 7 is a cross-sectional view of the ball screw nut according to the embodiment taken along a straight line VII-VII shown in FIG. 3.
Figure 8:
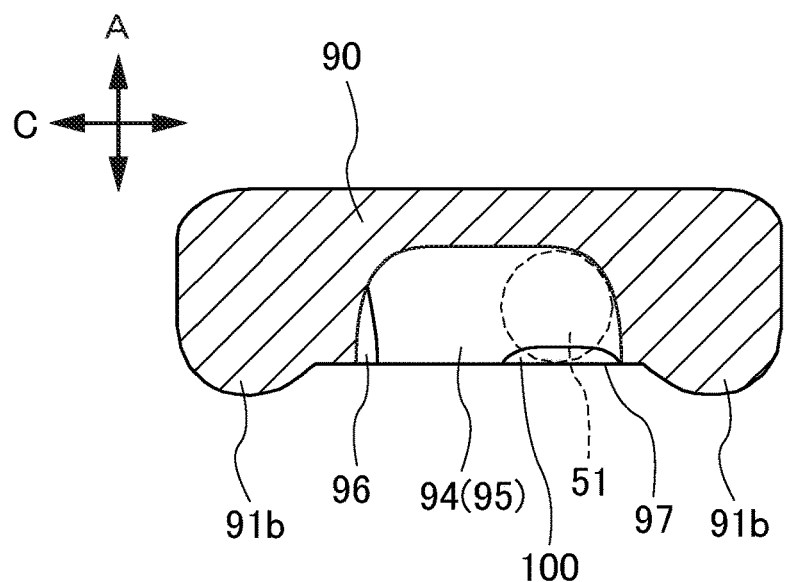
FIG. 8 is a cross-sectional view of the deflector according to the embodiment taken along a straight line VIII-VIII shown in FIG. 6.
Figure 9:
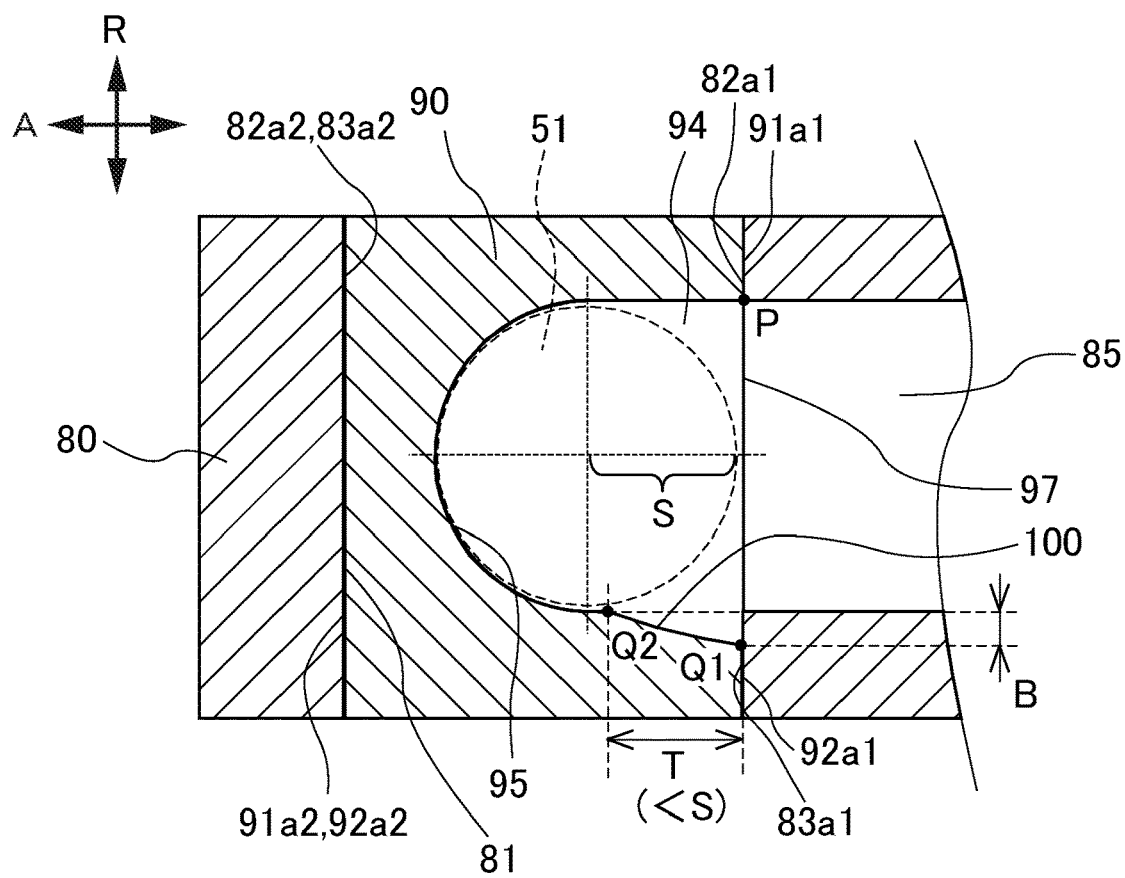
FIG. 9 is a cross-sectional view of the ball screw nut according to the embodiment taken along a straight line IX-IX shown in FIG. 3.
Figure 10:
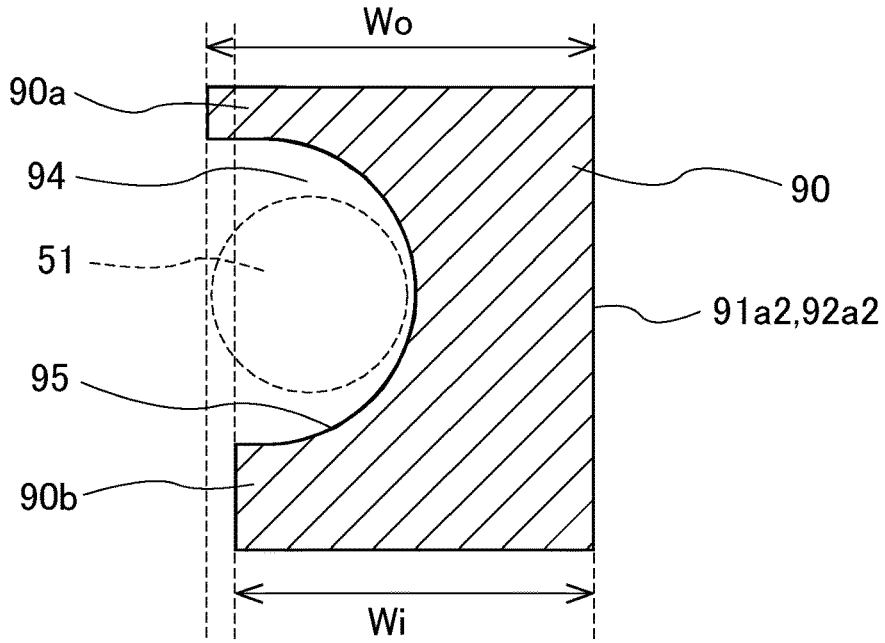
FIG. 10 is a cross-sectional view of the deflector according to the embodiment taken along a straight line X-X shown in FIG. 6.

In the axial direction side surfaces 91a1, 92a1 on one side of the deflector 90, an open groove 95 for allowing the passage 94 to open to the axial direction side surfaces 91a1 and 92a1 is formed. The open groove 95 is a groove continuously formed over the connection portion 96 between one end of the passage 94 and the rolling path 53 and the connection portion 97 between the other end of the passage 94 and the circulation path 85. The open grove 95 is formed to extend in the circumferential direction C from the inner surface side in the radial direction to the outer side in the radial direction of the deflector 90 around the axial center of the ball screw nut 70 when seeing the deflector 90 from the axial direction A as shown in FIG. 6 and FIG. 7. The passage 94 and the open groove 95 are formed so that a cross-sectional shape has an approximately semicircular shape or a U-shape as shown in FIG. 8, FIG. 9 and FIG. 10. The open groove 95 is formed to have the same groove width as the diameter 2S of the rolling ball 51 or to have a groove width slightly larger than the diameter 2S.

The deflector 90 is formed to be separated into two portions so as to sandwich the open groove 95 in the radial direction when seeing the axial direction side surfaces 91a1, 92a1 on one side from the outer side in the axial direction A. The open groove 95 of the deflector 90 is sandwiched by two portions separated in the radial direction. Hereinafter, a portion (a region shown by a satin pattern in FIG. 6) positioned on the outer side in the radial direction with respect to the open groove 95 in the deflector 90 is referred to as an outer-diameter side portion 90a and a portion (a region shown by a mesh pattern in FIG. 6) positioned on the inner side in the radial direction with respect to the open groove 95 in the deflector 90 is referred to as an inner-diameter side portion 90b, respectively. The outer-diameter side portion 90a and the inner-diameter side portion 90b sandwich the open groove 95 a cross-sectional shape of which is an approximately semicircular shape. Moreover, an interface between the outer-diameter side portion 90a and the inner-diameter side portion 90b in a portion where the outer-diameter side portion 90a and the inner-diameter side portion 90b are not separated by the open groove 95 is positioned in the center in the radial direction at an end portion where the open groove 95 is closed on the axial direction side surfaces 91a1, 92a1 as shown in FIG. 6.

The pair of deflectors 90-1 and 90-2 are arranged in the deflector mounting holes 81-1 and 81-2 of the nut main body 80 so that the axial direction side surfaces 91a1 and 92a1 where the open groove 95 is arranged face each other in the axial direction A. In the state where the pair of deflectors 90-1 and 90-2 are inserted into the deflector mounting holes 81-1 and 81-2 and fixed thereto, the passage 94 of one deflector 90-1 and the passage 94 of the other deflector 90-2 are connected to each other through the circulation path 85. In this case, the circulation path 85 can circulate the rolling balls 51 endlessly by allowing one end to communicate with the other end which are given two points in the rolling path 53 formed between the ball screw shaft 60 and the ball screw nut 70.

The deflector 90 has an introducing function that scoops up the rolling balls 51 positioning in the rolling path 53 through the opening hole on the inner surface in the radial direction and guides the rolling balls 51 to the circulation path 85 through the passage 94. The deflector 90 also has a discharging function that introduces the rolling balls 51 positioning in the circulation path 85 to the passage 94 through opening holes (specifically, part of the open groove 95) on the axial direction side surfaces 91a1, 91a2, then, discharges the rolling balls 51 to the rolling path 53.

Each of deflectors 90 has both the introducing function and the discharging function. When the ball screw shaft 60 strokes to one side in the axial direction A by operation of steering to one direction, one deflector 90-1 of the pair of deflectors 90 executes the introducing function and the other deflector 90-1 executes the discharging function respectively at the same time. When the ball screw shaft 60 strokes to the other side in the axial direction A by operation of steering in the other direction, the other deflector 90-2 executes the introducing function and one deflector 90-1 executes the discharging function respectively at the same time.

The deflector 90 is inserted into the deflector mounting hole 81 from an outer side in the radial direction at the time of assembling to the nut main body 80. The insertion of the deflector 90 into the deflector mounting hole 81 is performed in a direction in which shapes of both portions correspond to each other, specifically, the protruding portions 91b of the deflector 90 are fitted to the recessed portions 82b of the deflector mounting hole 81. The deflector 90 is positioned so that the supported surfaces 93 abut on the supporting surfaces 84 of the nut main body 80 as desired positions in the insertion direction D and is housed in the deflector hole 81.

In the state where the deflector 90 is inserted into the deflector mounting hole 81 and housed therein as described above, the axial direction side surfaces 91a1, 91a2 of the outer peripheral portion 91 face the axial direction side surfaces 82a1, 82a2 of the press-fitting hole portion 82 of the deflector mounting hole 81 and the circumferential direction side surfaces 91c1, 91c2 of the outer peripheral portion 91 face the circumferential direction side surfaces 82c1, 82c2 of the press-fitting hole portion 82 of the deflector mounting hole 81 as well as the axial direction side surfaces 92a1, 92a2 of the inner peripheral portion 92 face the axial direction side surfaces 83a1, 83a2 of the guide hole portion 83 of the deflector mounting hole 81 and the circumferential direction side surfaces 92c1, 92c2 of the inner peripheral portion 92 face the circumferential direction side surfaces 83c1, 83c2 of the guide hole portion 83 of the deflector mounting hole 81.

The deflector 90 is formed so that at least part of the axial direction side surfaces 91a1, 91a2 (for example, a region shown by slanted lines in FIG. 6) in the axial direction side surfaces 91a1, 91a2 and the circumferential side surfaces 91c1, 91c2 of the outer peripheral portion 91 has an interference with respect to the axial direction side surfaces 82a1, 82a2 and the circumferential side surfaces 82c1, 82c2 of the press-fitting hole portion 82. In the following description, a portion having an interference in the outer peripheral portion 91 of the deflector 90 is referred to as a press-fitting portion 98. A width Wo (max) of the axial direction side surface 91a1 and the axial direction side surface 91a2 where the press-fitting portion 98 in the outer peripheral portion 91 of the deflector 90 is provided is larger than a hole width L as a distance between the axial direction side surface 82a1 and the axial direction side surface 82a2 of the press-fitting hole portion 82 of the deflector mounting hole 81 before press-fitting and approximately corresponds to the hole width L after press-fitting.

The press-fitting portions 98 are preferably provided at least on outer surfaces of parts of respective protruding portions 91b on both sides in the circumferential direction C. The press-fitting portion 98 may be provided in the outer-diameter side portion 90a positioned on the outer side in the radial direction with respect to the open groove 95 but is not provided in the inner-diameter side portion 90b positioned on the inner side in the radial direction with respect to the open groove 95. In FIG. 6, the press-fitting portion 98 provided in the left-side protruding portion 91b in the protruding portions 98 at two places is provided in the outer-diameter side portion 90a, however, the press-fitting portion 98 provided in the right-side protruding portion 91b is not provided in the outer-diameter side portion 90a and is not provided in the inner-diameter side portion 90b either. The deflector 90 is press-fitted into the deflector mounting hole 81 by the press-fitting portions 98 and is interference-fitted thereto.

The deflector 90 is formed so that portions other than the press-fitting portions 98 in the axial direction side surfaces 91a1, 91a2 and the circumferential direction side surfaces 91c1, 91c2 of the outer peripheral portion 91 (hereinafter, referred to as non-press fitting portions 99) are fitted to the axial direction side surfaces 82a1, 82a2 and the circumferential direction side surfaces 82c1, 82c2 of the press-fitting hole portion 82 almost without a clearance. The width Wo of the axial direction side surface 91a1 and the axial direction side surface 91a2 where the non-press fitting portions 99 of the outer peripheral portion 91 of the deflector 90 are provided is approximately the same as the hole width L as a distance between the axial direction side surface 82a1 and the axial direction side surface 82a2 of the press-fitting hole portion 82 of the deflector mounting hole 81. The non-press fitting portions 99 of the deflector 90 are transition-fitted to the deflector mounting hole 81.

The deflector 90 is formed so that the axial direction side surfaces 92a1, 92a2 and the circumferential direction side surfaces 92c1, 92c2 of the inner peripheral potion 92 have clearances with respect to the axial direction side surfaces 83a1, 83a2 and the circumferential direction side surfaces 83c1, 83c2 of the guide hole portion 83. A width of the axial direction side surface 92a1 and the axial direction side surface 92a2 of the inner peripheral portion 92 of the deflector 90 is smaller than a hole width of the axial direction side surface 83a1 and the axial direction side surface 83a2 of the guide hole portion 83 of the deflector mounting hole 81. The entire region of the above inner-diameter side portion 90b is included in the inner peripheral portion 92. The outer-diameter side portion 90a is included in the outer peripheral portion 91 and the inner peripheral portion 92. The deflector 90 is clearance-fitted to the deflector mounting hole 81 at the inner peripheral portion 92. When the deflector 90 is inserted into the deflector mounting hole 81 in the insertion direction D, the inner peripheral portion 92 of the deflector 90 is guided with respect to the guide hole portion 83 during a period before the outer peripheral portion 91 is press-fitted to the deflector mounting hole 81 until the press fitting is completed.

The ball bearing 52 and the driven pulley 42 are assembled to an outer peripheral surface of the ball screw nut 70. A clearance extending in the radial direction R is formed between the ball screw nut 70 and the ball bearing 52/the drive pulley 42. Hereinafter, a radial direction dimension of the clearance is denoted by "B". The ball bearing 52 and the driven pulley 42 have a coming-off preventing function that prevents the deflector 90 inserted into the deflector mounting hole 81 of the nut main body 80 from coming off to the outer side in the radial direction after the assembly.

(3. Relation between Deflector and Nut Main Body in Ball Screw Nut 70)

In the ball screw device 50 according to the embodiment, the deflector 90 in the ball screw nut 70 is formed so that at least one end of the passage 94 (specifically, the connection portion 97 side with respect to the circulation path 85) opens to the axial direction side surfaces 91a1, 92a1 on one side. In the deflector 90, a portion near the connection portion 97 with respect to the circulation path 85 in the passage 94 is formed to extend along the axial direction A along which the circulation path 85 extends. Also in the deflector 90, the passage 94 is formed to have the same path width as the diameter 2S of the rolling ball 51 or to have a path width slightly larger than the diameter 2S between the connection portion 96 with respect to the rolling path and the connection portion 97 with respect to the circulation path 85 except for the connection portion 97 and the vicinity of the connection portion 97. On the other hand, the passage 94 is formed to have a path width larger than the diameter 2S of the rolling ball 51 in the connection portion 97 and the vicinity of the connection portion 97.

The deflector 90 has an inclined portion 100 provided at a peripheral part of the connection portion 97. The inclined portion 100 has a function that secures passing of the rolling balls 51 at the connection portion 97 when the insertion position of the deflector 90 with respect to the deflector mounting hole 81 is displaced from a desired position in the nut radial direction within a range of a given distance. The inclined portion 100 is formed so that the path width of the passage 94 is increased as coming close to the connection portion 97. The inclined portion 100 is a portion formed by chamfering a corner portion into a tapered shape, which is positioned on a lower inner side in the radial direction with respect to the connection portion 97 of the deflector 90. The opening width of the passage 94 at the connection portion 97 is the maximum in path widths in the entire region of the passage 94, which approximately corresponds to a value obtained by adding the radial direction dimension B of the clearance between the ball screw nut 70 and the ball bearing 52/the driven pulley 42 to the diameter 2S of the rolling ball 51.

The inclined portion 100 is formed closer to the connection portion 97 side than a position apart from the position of the connection portion 97 by a distance of a radius S of the rolling ball 51 in the axial direction A as shown in FIG. 9. The inclined portion 100 is provided in an area from the position of the connection portion 97 to a position (point Q2) apart to the inner side in the axial direction A by a distance T (<S). The inclined portion 100 is formed between a point Q1 intersecting the axial direction side surface 92a1 and the point Q2 intersecting a plane for originally forming the open groove 95 and the passage 94. The point Q2 is positioned closer to the connection portion 97 side than a position apart from the position of the connection portion 97 by the distance of the radius S of the rolling ball 51 in the axial direction A.

The inclined portion 100 is formed so that distances with respect to a point P at a corner positioned at an upper side of the connection portion 97 in the nut main body 80 are equal to or larger than the diameter 2S of the rolling ball 51 in all positions on the surface between the point Q1 and the point Q2 when the position of the deflector 90 is displaced with respect to the nut main body 80 from a desired position to the outer side in the radial direction by the maximum dimension (namely, the radial direction dimension S of the clearance). It is not preferable that a cross-sectional shape is formed in a straight line shape on the surface between the point Q1 and the point Q2 for avoiding excessive increase in path width of the passage 94 of the deflector 90 by the presence of the inclined portion 100, and it is desirable that the cross-sectional shape is formed in a curved shape to bend downward.

In the above ball screw nut 70, after the deflector 90 is inserted into the deflector mounting hole 81 of the nut main body 80 from the outer side in the radial direction to be positioned at a desired position where the supported surfaces 93 abut on the supporting portions 84 of the nut main body 80, the deflector 90 may be displaced to the outer side in the radial direction by the radial direction dimension B of the clearance between the ball screw nut 70 and the ball bearing 52/the driven pulley 42 at the maximum.

In response to the above, the inclined portion 100 that secures passing of the rolling balls 51 at the connection portion 97 when the insertion position of the deflector 90 with respect to the deflector mounting hole 81 is displaced from the desired position by the radial direction dimension B is provided at the peripheral part of the connection portion between the passage 94 of the deflector 90 and the circulation path 85 of the nut main body 80 (specifically, a corner positioned in the inner side in the radial direction with respect to the connection portion 97). The inclined portion 100 is formed so that the distance with respect to the point P of the nut main body 80 is equal to or larger than the diameter 2S of the rolling ball 51 at every position on the surface between the point Q1 and the point Q2 even when the insertion position of the deflector 90 with respect to the deflector mounting hole 81 is displaced from the desired position to the outer side in the radial direction by the radial direction dimension B of the clearance at the maximum.

Figure 11:
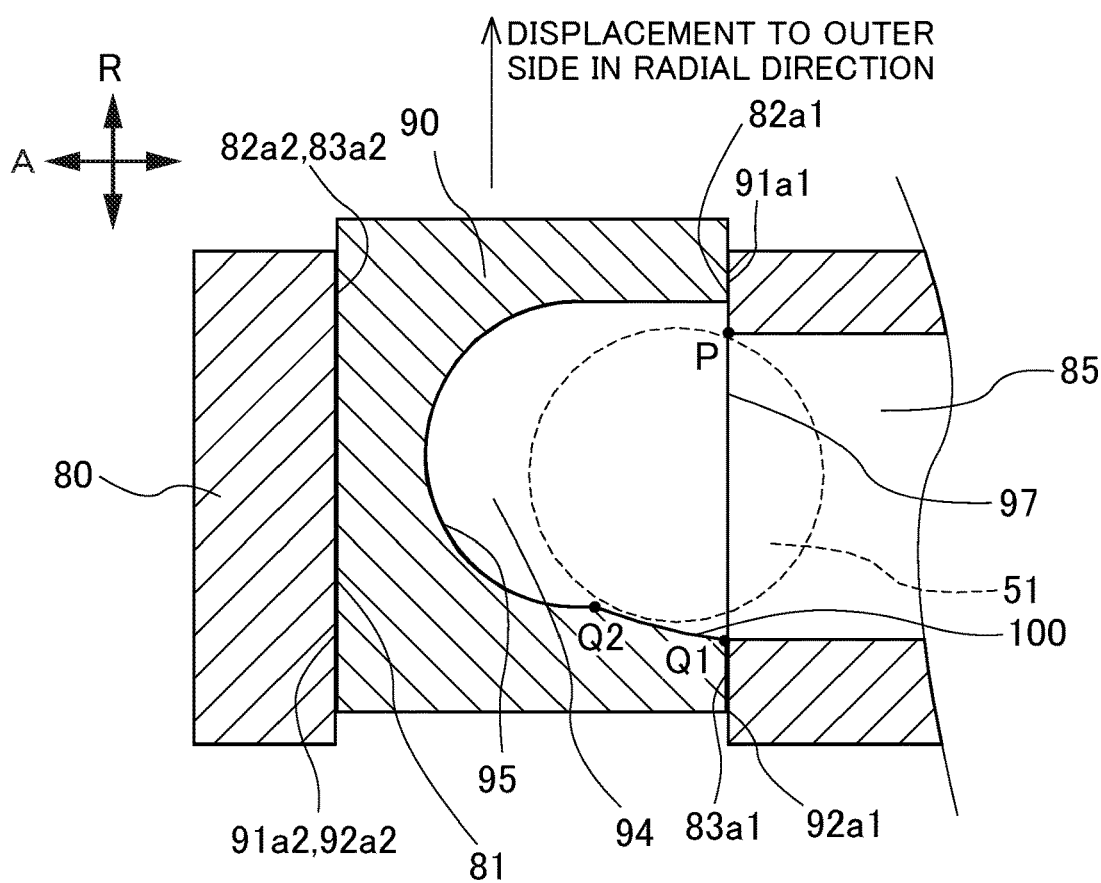
FIG. 11 is a view for explaining a state generated when the deflector is displaced in position with respect to the deflector mounting hole from a desired position to the outer side in the radial direction in the ball screw device according to the embodiment.

In the above structure, even when the insertion position of the deflector 90 with respect to the deflector mounting hole 81 is displaced from the desired position to the outer side in the radial direction by the radial direction dimension B as shown in FIG. 11, it is possible to avoid narrowing of the passage in the connection portion 97, and the opening width in which the passage 94 and the circulation path 85 are effectively connected in the connection portion 97 can be secured to be equal to or larger than the diameter 2S of the rolling ball 51. Accordingly, even when the insertion position of the deflector 90 with respect to the deflector mounting hole 81 is displaced from the desired position to the outer side in the radial direction by the radial direction dimension B at the maximum, it is possible to suppress clogging of the rolling balls 51 in the vicinity of the connection portion 97.

Also in the structure of the deflector 90 having the inclined portion 100, it is not necessary to increase the path width itself in the entire region of the passage 94 of the deflector 90 by the radial direction dimension B of the clearance as compared with the diameter 2S of the rolling ball 51 for suppressing occurrence of clogging of the rolling balls 51, and the path width at a portion close to the connection portion 97 in the passage 94 of the deflector 90 other than the inclined portion 100 may be the same as the diameter 2S of the rolling ball 51 or may be increased to be slightly larger than the diameter 2S.

The inclined portion 100 is formed closer to the connection 97 than the position apart from the position of the connection portion 97 of the deflector 90 by the distance of the radius S of the rolling ball 51. The passage 94 is formed to have the same path width as the diameter 2S of the rolling ball or a path width slightly larger than the diameter 2S excluding the inclined portion 100. According to the structure, it is possible to suppress arrangement in which ball centers of plural rolling balls 51 are aligned in a triangle wave shape in the passage 94 of the deflector 90, namely, it is possible to suppress arrangement in which plural rolling balls 51 are arranged zigzag, and the ball centers of the plural rolling balls 51 are aligned in the straight line and the plural rolling balls 51 are aligned in series, which differs from the structure in which the path widths in the entire region of the passage 94 of the deflector 90 are larger than the diameter 2S of the rolling ball 51 by the radial direction dimension B, therefore, circulation of the rolling balls 51 inside the passage 94 can be smooth.

Accordingly, when adopting the ball screw device 50 according to the embodiment, smooth circulation of rolling balls 51 can be secured while suppressing occurrence of clogging of the rolling balls 51 due to the displacement in the radial direction between the deflector 90 and the nut main body 80 in the ball screw nut 70. Accordingly, generation of torque variation due to ball clogging can be suppressed and smooth steering feeling can be secured.

(4. Relation between Deflector and Deflector Mounting Hole)

In the ball screw device 50 according to the embodiment, the deflector 90 is moved from the outer side in the radial direction of the nut main body 80 toward the inner side in the radial direction (namely, the insertion direction D) at the time of assembling the deflector 90 of the ball screw nut 70 with the nut main body 80 to thereby be inserted into the deflector mounting hole 81. The deflector 90 is formed so that the inner-diameter side portion 90b positioned on the inner side in the radial direction with respect to the open groove 95 and the outer-diameter side portion 90a positioned on the outer side of the radial direction with respect to the open groove 95 have the following positional relationship.

That is, the deflector 90 is formed so that a region occupied by the inner-diameter side portion 90b at the time of being projected from the outer side in the radial direction toward the insertion direction D of the deflector mounting hole 81 does not protrude to the outer side (specifically, the outer side in the axial direction of the ball screw nut 70) from the region occupied by the outer-diameter side portion 90a. That is, the deflector 90 is formed so that a position of an outer edge on the open groove 95 side in the region occupied by the inner-diameter side portion 90b is set inside the region occupied by the outer-diameter side portion 90a (specifically, an inner side of the position of the outer edge on the open groove 95 side in the region occupied by the inner-diameter side portion 90b (namely, the inner side of the region in the axial direction A of the ball screw nut 70)) in a projection view of the deflector 90 in the insertion direction D.

Figure 12:
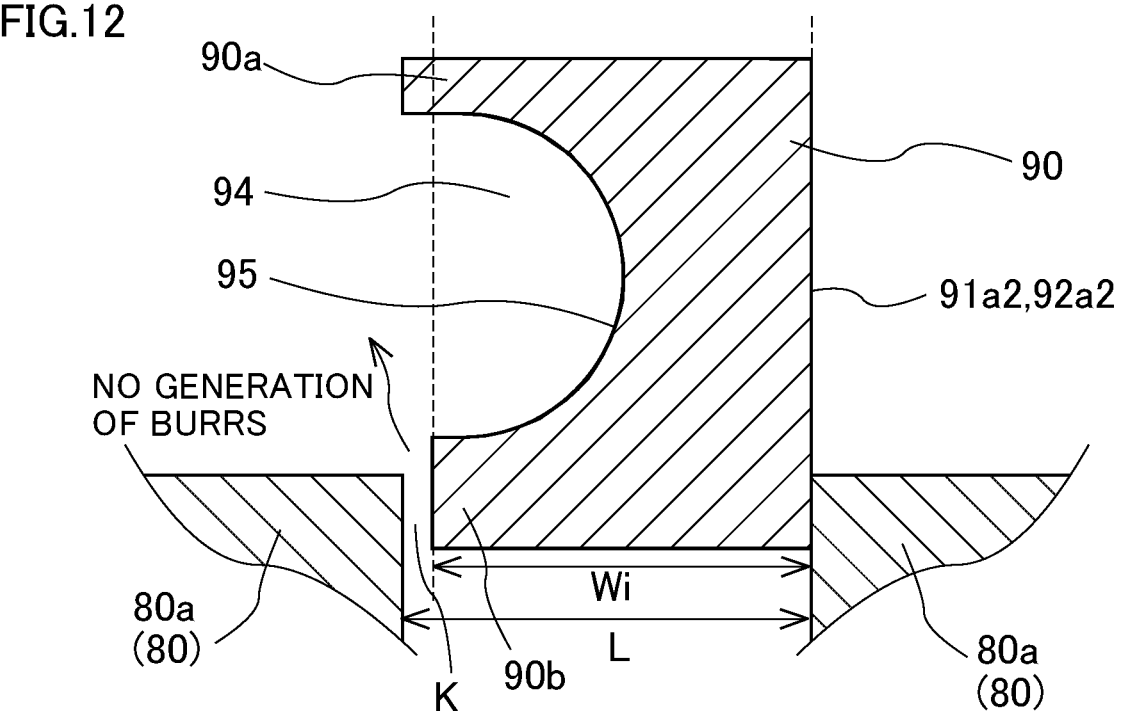
FIG. 12 is a view illustrating an initial state where the deflector according to the embodiment is inserted into the deflector mounting hole of a nut main body.

In processes of the deflector 90 being inserted into the deflector mounting hole 81 and housed therein, first, there is a timing at which the inner-diameter side portion 90b of the axial direction side surfaces 91a1, 91a2 of the deflector 90 faces an entrance shoulder portion 80a of the nut main body 80 at an opening of the press-fitting hole portion 82 of the deflector mounting hole 81 as shown in FIG. 12. Then, after that, the open groove 95 of the deflector 90 faces the entrance shoulder portion 80a of the nut main body 80.

The inner-diameter side portion 90b of the deflector 90 is not provided with the press-fitting portion 98 having an interference with respect to the press-fitting hole portion 82 of the deflector mounting hole 81. In the deflector 90, the axial direction side surfaces 92a1, 92a2 and the circumferential direction side surfaces 92c1, 92c2 of the inner peripheral portion 92 including the entire region of the inner-diameter side portion 90b are formed to have clearances with respect to the axial direction side surfaces 83a1, 83a2 and the circumferential direction side surfaces 82c1, 83c2 of the guide hole portion 83. The axial direction side surfaces 83a1, 83a2 of the guide hole potion 83 form the same plane with respect to the axial direction side surfaces 82a1, 82a2 of the press-fitting hole portion 82 without a step. The width Wi in the axial direction A of the inner peripheral portion 92 is smaller than the width Wo in the axial direction A of the outer peripheral portion 91 and is smaller than the hole width L as a distance between the axial direction side surface 82a1 and the axial direction side surface 82a2 of the press-fitting hole portion 82. Accordingly, in the timing at which the inner-diameter side portion 90b of the deflector 90 faces the entrance shoulder portion 80a of the nut body portion 80, a clearance K is formed between the inner-diameter side portion 90b of the deflector 90 and the entrance shoulder portion 80a of the nut body portion 80.

In the above structure, the inner-diameter side portion 90b of the deflector 90 is not press-fitted without a clearance at the entrance shoulder portion 80a of the nut body portion 80 at the time of assembling the deflector 90 and the nut body portion 80 in the ball screw nut 70, and it is possible to avoid a situation in which the inner-diameter side portion 90b is scraped by an edge of the entrance shoulder portion 80a. When the inner-diameter side portion 90b is not scraped when facing the entrance shoulder portion 80a of the nut body portion 80, burrs caused by scraping of the deflector 90 are not generated, therefore, a situation in which burrs due to the scraping of the deflector 90 enter the inside of the open groove 95 does not happen when the open groove 95 faces the entrance shoulder portion 80a of the nut body portion 80 after that.

Figure 13:
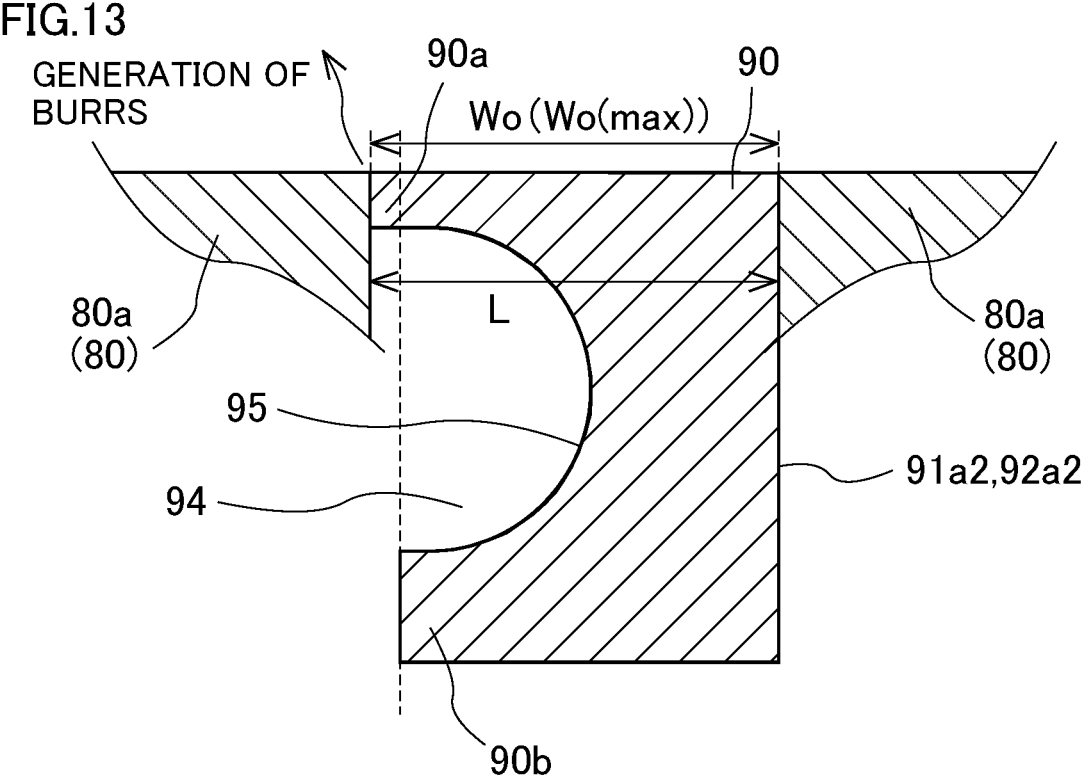
FIG. 13 is a view illustrating a state where the deflector according to the embodiment has been inserted into the deflector mounting hole of the nut main body.

After the open groove 95 of the deflector 90 faces the entrance shoulder portion 80a of the nut body portion 80 as described above, the outer-diameter side portion 90a of the deflector 90 faces the entrance shoulder portion 80a of the nut body portion 80 as shown in FIG. 13. The width Wo in the axial direction A of the outer peripheral portion 91 is slightly smaller than or slightly larger than the hole width L as the distance between the axial direction side surface 82a1 and the axial direction side surface 82a2 of the press-fitting hole portion 82. A width Wo (max) in the axial direction A of the press-fitting portion 98 of the outer peripheral portion 91 is larger than a hole width L (max) as a distance between a bottom surface of the recessed portion 82b of the axial direction side surface 82a1 of the press-fitting hole portion 82 and the axial direction side surface 82a2. In a case where at least part of the press-fitting portion 98 is included in the outer-diameter side portion 90a, the press-fitting portion 98 is press-fitted without a clearance at the entrance shoulder portion 80a of the nut body portion 80 when the outer-diameter side portion 90a of the deflector 90 faces the entrance shoulder portion 80a of the nut body portion 80, therefore, the outer-diameter side portion 90a may be scraped by the edge of the entrance shoulder portion 80a. In this case, burrs are generated due to scraping of the deflector 90, however, the burrs do not enter the inside of the open groove 95 of the deflector 90 and are discharged to the outside of the deflector 90.

In the ball screw nut 70, when the press-fitting portions 98 of the deflector 90 are press-fitted at the entrance shoulder portions 80a of the nut main body 80 and the deflector 90 and the nut main body 80 reach a desired positional relationship, the assembly of the deflector 90 and the nut main body 80 is completed.

Therefore, it is possible to prevent burrs generated by insertion of the deflector 90 into the deflector mounting hole 81 in the ball screw nut 70 from entering the inside of the passage 94 through the open groove 95 when adopting the ball screw device 50 according to the embodiment. Accordingly, it is possible to prevent inhibition of rolling of the rolling balls 51 due to existence of burrs in the passage 94 of the deflector 90 or the circulation path 85 of the nut main body 80 in the ball screw device 50, therefore, torque variation in the ball screw device 50 can be suppressed as well as durability of the ball screw device 50 can be improved.

As described above, the width Wo in the axial direction A of the outer peripheral portion 91 of the deflector 90 is slightly smaller or slightly larger than the hole width L as the distance between the axial direction side surface 82a1 and the axial direction side surface 82a2 of the press-fitting hole portion 82. The width Wo (max) in the axial direction A of the press-fitting portion 98 of the outer peripheral portion 91 is larger than the hole width L (max) as the distance between the bottom surface of the recessed portion 82b of the axial direction side surface 82a1 and the axial direction side surface 82a2 in the press-fitting hole portion 82. In this structure, the outer peripheral portion 91 of the deflector 90 is transition-fitted or interference-fitted to the deflector mounting hole 81 after the assembly of the deflector 90 and the nut main body 80 is completed. Accordingly, it is possible to avoid the open groove 95 of the deflector 90 communicating with a space in the outer side in the radial direction through a large clearance.

Therefore, it is possible to prevent foreign matter from entering the open groove 95 in the deflector 90 from the outside after the assembly of the deflector 90 and the nut main body 80 is completed. Accordingly, inhibition of rolling of the rolling balls 51 due to entering of foreign matter to the passage 94 of the deflector 90 can be prevented, which can suppress torque variation of the ball screw device 50 as well as durability of the ball screw device 50 can be improved.

(5. Operation and Effect in Ball Screw Device and Steering Device)

The ball screw device 50 according to the embodiment includes the ball screw shaft 60 having the outer-peripheral rolling grooves 61 formed in a spiral manner on the outer peripheral surface, the ball screw nut 70 arranged on the same axis on the outer side in the radial direction with respect to the ball screw shaft 60 and formed in a cylindrical shape so as to rotate relatively with respect to the ball screw shaft 60, in which the inner-peripheral rolling grooves 71 are formed in a spiral manner on the inner peripheral surface, the rolling balls 51 capable of rolling in the rolling path 53 surrounded by the outer-peripheral rolling grooves 61 and the inner-peripheral rolling grooves 71 and the circulation path 85 allowing one end of the rolling path 53 to communicate with the other end thereof to circulate the rolling balls 51 endlessly. The ball screw nut 70 includes the nut main body 80 in which at least part of the inner-peripheral rolling grooves 71 and at least part of the circulation path 85 are respectively formed and the deflector mounting hole 81 piercing in the radial direction R is provided, and the deflector 90 inserted into the deflector mounting hole 81 from the outer side in the radial direction and fixed thereto, in which the passage 94 allowing the inner-peripheral rolling grooves 71 of the nut main body 80 to communicate with the circulation path 85 to allow the rolling balls 51 to pass therethrough is formed and the open groove 95 allowing the passage 94 to open to the side surface of the circulation path 85 side is formed. The deflector 90 has the inclined portion 100 provided at a peripheral part of the connection portion 97 where the circulation path 85 of the nut main body 80 and the passage 94 of the deflector 90 are connected to each other, which secures passing of the rolling balls 51 at the connection portion 97 when the insertion position of the deflector 90 with respect to the deflector mounting hole 81 is displaced from a desired position in the range of the radial direction dimension B of the clearance between the ball screw nut 70 and the ball bearing 52/the driven pulley 42.

According to the structure, even when the insertion position of the deflector 90 with respect to the deflector mounting hole 81 is displaced from the desired position to the outer side in the radial direction by the radial direction dimension B of the clearance at the maximum, the passing of the rolling balls 51 is secured at the connection portion 97 between the passage 94 of the deflector 90 and the circulation path 85 of the nut body portion 85 due to the inclined portion 100. Accordingly, if the insertion position of the deflector 90 is displaced, clogging of the rolling balls 51 in the vicinity of the connection portion 97 can be suppressed.

Moreover, in the structure of the deflector 90, it is not necessary to increase the path width itself to be larger than the diameter 2S of the rolling ball 51 by the radial direction dimension B of the clearance over the entire region of the passage 94 of the deflector 90 for suppressing occurrence of clogging of the rolling balls 51. Accordingly, it is possible to suppress the plural rolling balls 51 being arranged zigzag inside the passage 94 of the deflector 90 just by setting the path width of the passage 94 not including the inclined portion 100 to the same as the diameter 2S of the rolling ball 51 or to be slightly larger than the diameter 2S. Therefore, smooth circulation of rolling balls 51 can be secured while suppressing occurrence of clogging of the rolling balls 51 caused by displacement in the radial direction between the deflector 90 and the nut main body 80 in the ball screw nut 70.

In the ball screw device 50, the inclined portion 100 is formed so as to secure the passing of the rolling balls 51 at the connection portion 97 when the insertion position of the deflector 90 with respect to the deflector mounting hole 81 is displaced from the desired position to the outer side in the radial direction within the range of the radial direction dimension B of the clearance. According to the structure, even when the insertion position of the deflector 90 is displaced from the desired position to the outer side in the radial direction, clogging of the rolling balls 51 in the vicinity of the connection portion 97 can be suppressed.

In the ball screw device 50, the inclined portion 100 is provided at the peripheral part of the inside in the radial direction with respect to the connection portion 97 in the deflector 90. According to the structure, clogging of the rolling balls 51 in the vicinity of the connection portion 97 can be suppressed by the inclined portion 100.

In the ball screw device 50, the inclined portion 100 is formed closer to connection portion 97 than the position apart from the connection portion 97 in the deflector 90 by the distance of the radius S of the rolling ball 51. According to the structure, it is possible to suppress the plural rolling balls 51 being arranged zigzag inside the passage 94 of the deflector 90 as far as possible. Therefore, smooth circulation of rolling balls 51 can be secured while suppressing occurrence of clogging of the rolling balls 51 caused by displacement in the radial direction between the deflector 90 and the nut main body 80 in the ball screw nut 70.

In the ball screw device 50, the inclined portion 100 is formed so that the effective opening width of the connection portion 97 is equal to or more than the diameter 2S of the rolling ball 51 when the insertion position of the deflector 90 with respect to the deflector mounting hole 81 is displaced from the desired position within the range of the radial direction dimension B of the clearance. According to the structure, even when the insertion position of the deflector 90 with respect to the deflector mounting hole 81 is displaced from the desired position to the outer side in the radial direction by the radial direction dimension B of the clearance at the maximum, the effective opening width in the connection portion 97 is secured to be equal to or more than the diameter 2S of the rolling ball 51 by the inclined portion 100. Accordingly, it is possible to suppress clogging of the rolling balls 51 in the vicinity of the connection portion 97 if the insertion position of the deflector 90 is displaced.

In the ball screw device 50, the deflector 90 includes the inner-diameter side portion 90b positioned in the inner side in the radial direction with respect to the open groove 95 and the outer-diameter side portion 90a positioned in the outer side in the radial direction with respect to the open groove 95, which is formed so that the outer edge position of the region occupied by the inner-diameter side portion 90b on the open groove 95 side is set inside the region with respect to the outer edge position of the region occupied by the outer-diameter side portion 90a on the open groove 95 side when the deflector 90 is projected toward the insertion direction D of the deflector mounting hole 81.

According to the structure, in the timing at which the inner-diameter side portion 90b of the deflector 90 faces the entrance shoulder portion 80a of the nut body portion 80 in the process of the deflector 90 being inserted into the deflector mounting hole 81, the clearance K is formed between the inner-diameter side portion 90b and the entrance shoulder portion 80a, therefore, it is possible to avoid the situation in which the inner-diameter side portion 90b abuts on the entrance shoulder portion 80a and is scraped by the entrance shoulder portion 80a, which avoids generation of burrs. In the timing at which the outer-diameter side portion 90a of the deflector 90 faces the entrance shoulder portion 80a of the nut body portion 80, there is a case where the outer-diameter side portion 90a is scraped by the edge of the entrance shoulder portion 80a, however, burrs generated at this time do not enter the inside of the open groove 95 and are discharged to the space in the outer side in the radial direction of the deflector 90. Therefore, it is possible to prevent burrs generated due to the insertion of the deflector 90 into the deflector mounting hole 81 in the ball screw nut 70 from entering the inside of the passage 94 through the open groove 95. Accordingly, it is possible to avoid inhibition of rolling of the rolling balls 51 in the ball screw device 50, which can suppress torque variation and reduction of durability.

The width Wi in the axial direction A of the inner-diameter side portion 90b is smaller than the width Wo in the axial direction A of the outer-diameter side portion 90a in the ball screw device 50. According to the structure, it is possible to avoid the inner-dimeter side portion 90b being scraped by the edge of the entrance shoulder portion 80a in the timing at which the inner dimeter side portion 90b faces the entrance shoulder portion 80a of the nut main body 80 corresponding to the outer-diameter side portion 90a at the time of inserting the deflector 90 into the deflector mounting hold 81. Therefore, it is possible to prevent generation of burrs due to the insertion of the inner-dimeter side portion 90b of the deflector 90 into the deflector mounting hole 81 in the ball screw nut 70.

In the ball screw device 50, the deflector mounting hole 81 has the hole width L corresponding to the width Wo in the axial direction A of the outer-diameter side portion 90a and larger than the width Wi in the axial direction A of the inner-diameter side portion 90b. According to the structure, it is possible to avoid the inner-diameter side portion 90b of the deflector 90 being scraped by the edge of the deflector mounting hole 81 when the inner-diameter side portion 90b is inserted into the deflector mounting hole 81 of the nut main body 80. Therefore, it is possible to prevent generation of burrs due to the insertion of the inner-diameter side portion 90b of the deflector 90 into the deflector mounting hole 81 in the ball screw nut 70.

In the ball screw device 50, the outer-diameter side portion 90a has the press-fitting portion 98 press-fitted to the deflector mounting hole 81. According to the structure, if the press-fitting portion 98 of the deflector 90 is scraped by the edge of the entrance shoulder portion 80a of the nut main body 80 by the press fitting of the press-fitting portion 98 into the deflector mounting hole 81 at the time of insertion of the deflector into the deflector mounting hole 81, generated burrs are discharged to the space on the outer side in the radial direction of the deflector 90. Therefore, it is possible to prevent burrs generated due to the insertion of the deflector 90 into the deflector insertion hole 81 of the ball screw nut 70 from entering the inside of the passage 94 through the open groove 95.

In the ball screw device 50, the press-fitting portions 98 are provided on side surfaces in which the open groove 95 is formed. The press-fitting portions 98 are provided on both end portions in the circumferential direction of the deflector 90 and are provided on side surfaces on which the open groove 95 is formed at one place or more. According to the structure, the deflector 90 can be press-fitted to the deflector mounting hole 81 at both end portions in the circumferential direction of the outer-diameter side portion 90a, therefore, the deflector 90 can be positively fixed to the deflector mounting hole 81. As the entire deflector 90 is sandwiched in the axial direction A at the time of press fitting at the press-fitting portions 98, an overlap allowance between the outer peripheral portion 91 of the deflector 90 and the entrance shoulder portion 80a of the nut main body 80 can be reduced, which can suppress an amount of burrs to be generated.

In the ball screw device 50, the press-fitting portions 98 are provided in the protruding portions 91b protruding in the axial direction A with respect to other portions (non-press fitting portions 99) in the outer-diameter side portion 90a. According to the structure, the deflector 90 can be press-fitted to the deflector mounting hole 81 at the protruding portions 91b, the deflector 90 can be fixed to the deflector mounting hole 81 positively. Moreover, the press-fitting portions 98 where the amount of burrs to be generated is relatively large can be kept away from the open groove 95, therefore, the risk of burrs entering the open groove 95 can be reduced.

The ball screw device 50 is provided in the steering device 1. According to the structure, it is possible to realize the steering device 1 capable of securing smooth circulation of the rolling balls 51 while suppressing occurrence of clogging of the rolling balls 51 due to the displacement in the radial direction between the deflector 90 and the nut main body 80 in the balls screw nut 70. It is also possible to realize the steering device 1 preventing burrs from entering the passage 94 of the deflector 90 of the ball screw device 50.

(6. Modification Examples)

Incidentally, in the above embodiment, the deflector 90 is press-fitted to the deflector mounting hole 81 when the deflector 90 is fixed to the deflector mounting hole 81 of the nut main body 80. However, the present invention is not limited to this, and it is also preferable that the deflector 90 is fixed to the deflector mounting hole 81 by caulking after the deflector is inserted into the deflector mounting hole 81.

Also in the above embodiment, the inclined portion 100 is provided at the peripheral part of the connection portion between the passage 94 of the deflector 90 and the circulation path 85 of the nut main body 80 as shown in FIG. 6 and FIG. 8. However, the present invention is not limited to this, and the inclined portion 100 may be provided not only at the peripheral part of the connection portion 97 but also over the entire region of the open groove 95 where the passage 94 is allowed to open to the axial direction side surfaces 91a1, 92a1 which are continuously provided between the connection portion 96 with respect to the rolling path 53 and the connection portion 97 with respect to the circulation path 85 in the deflector 90.

Also in the above embodiment, the deflector 90 of the ball screw nut 70 is a so-called open-groove type deflector in which the passage 94 opens to the entire region. However, the present invention is not limited to this, and the deflector 90 maybe a so-called tunnel type deflector in which part of the passage 94 is blocked like a tunnel. In this case, the inclined portion 100 is provided at the peripheral part of the connection portion 97 in such deflector 90.

Figure 14:
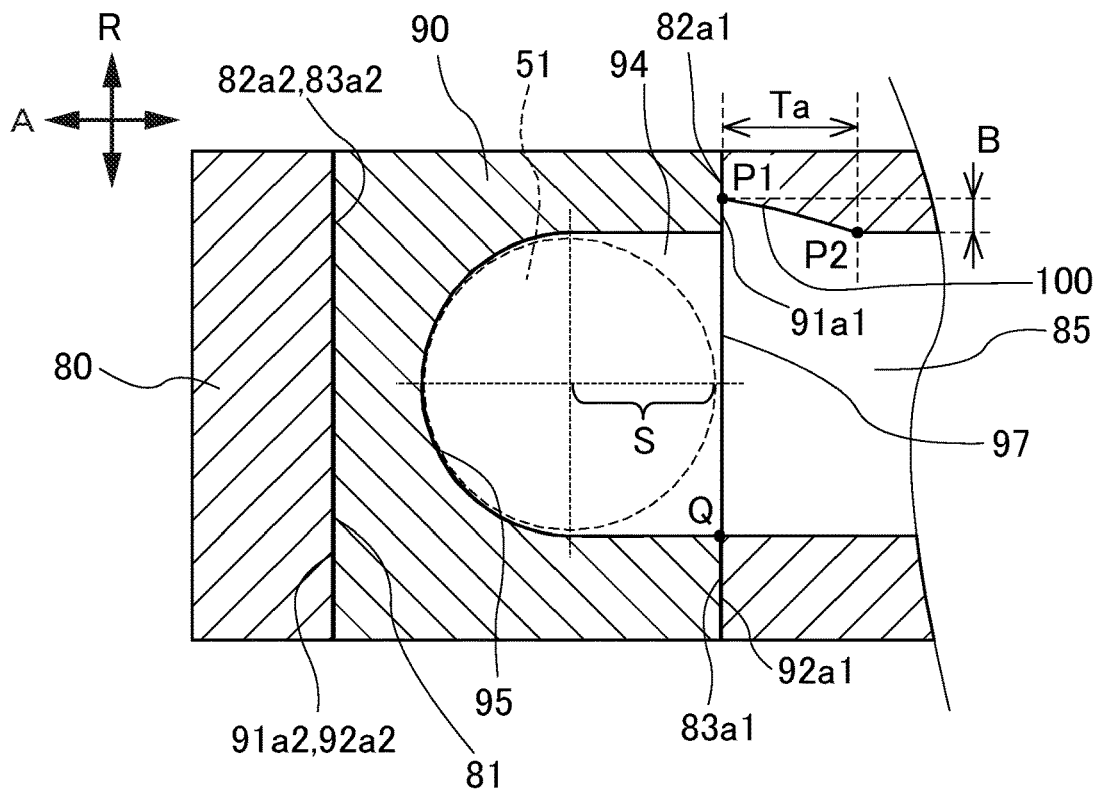
FIG. 14 is a cross-sectional view of a ball screw nut included in a ball screw device according to a first modification example of the present invention taken along a straight line IX-IX shown in FIG. 3.
Figure 15:
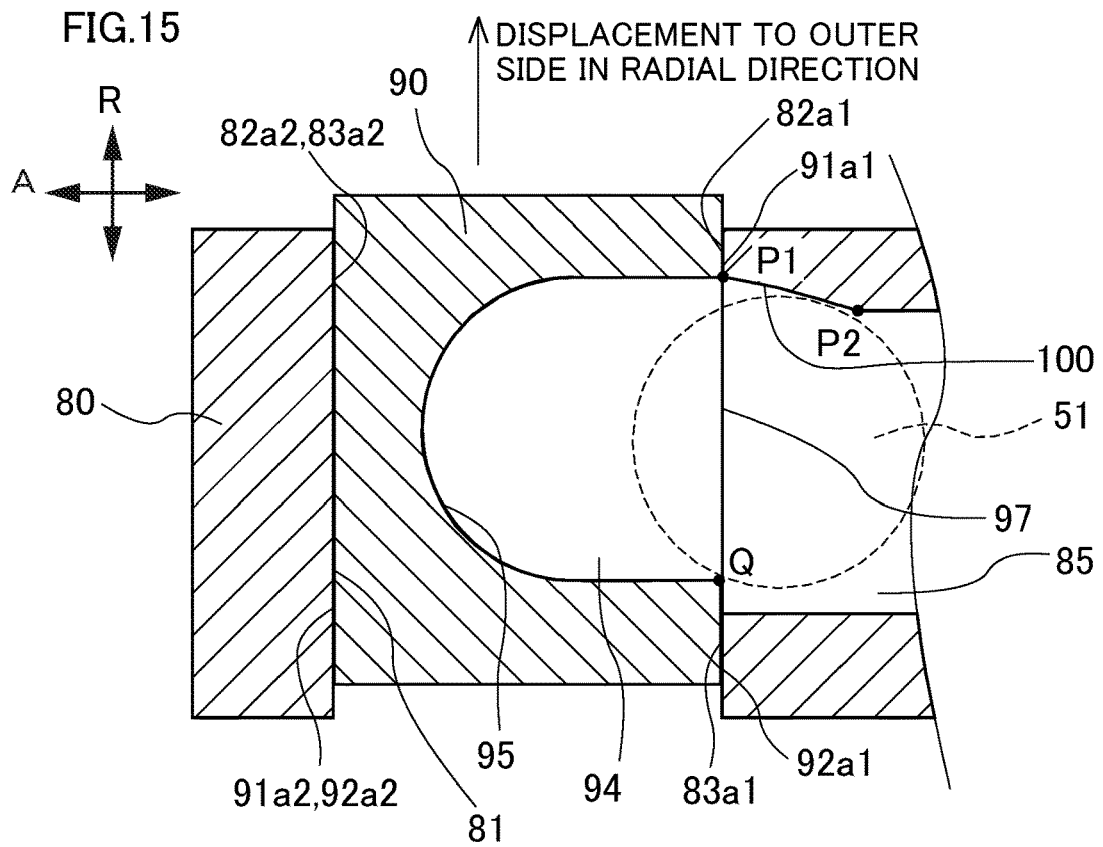
FIG. 15 is a view for explaining a state generated when the deflector is displaced in position with respect to the deflector mounting hole from a desired position to the outer side in the radial direction in the ball screw device according to the first modification example.

In the above embodiment, the inclined portion 100 is provided in the deflector 90 for securing passing of the rolling balls 51 in the connection portion 97 between the passage 94 of the deflector 90 and the circulation path 85 of the nut main body 80 when the insertion position of the deflector 90 with respect to the deflector mounting hole 81 is displaced from the desired position in the nut radial direction to the outer side in the nut radial direction within a range of a given distance. However, the present invention is not limited to this, and the inclined portion 100 may be provided in the nut main body 80 as shown in FIG. 14 and FIG. 15 instead of the deflector 90.

In the modification example, a vicinity of the connection portion 97 in the circulation path 85 of the nut main body 80 with respect to the passage 94 of the deflector 90 is formed so as to extend along the axial direction A. The circulation path 85 is formed to have the same path width as the diameter 2S of the rolling ball 51 or to have a slightly larger path width than the diameter 2S except for the connection portion 97 with respect to the passage 94. On the other hand, the circulation path 85 is formed to have a larger path width than the diameter 2S of the rolling ball 51 in the connection portion 97 and the periphery of the connection portion 97.

The nut main body 80 has the inclined portion 100 provided at the peripheral part of the connection portion 97. The inclined portion 100 has a function of securing passing of the rolling balls 51 in the connection portion 97 when the insertion position of the deflector 90 with respect to the deflector mounting hole 81 is displaced from the desired position in the nut radial direction to the outer side in the nut radial direction within the range of the given distance. The incline portion 100 is formed so that the path width of the circulation path 85 is increased as coming close to the connection portion 97. The connection portion 100 is the portion formed by chamfering a corner portion into a tapered shape, which is positioned on an upper outer side in the radial direction with respect to the connection portion 97 in the nut main body 80. An opening width of the circulation path 85 at the connection portion 97 is the maximum in path widths in the entire region of the circulation path 85, which approximately corresponds to a value obtained by adding the radial direction dimension B of the clearance between the ball screw nut 70 and the ball bearing 52/the driven pulley 42 to the diameter 2S of the rolling ball 51.

The inclined portion 100 is provided in an area from the position of the connection portion 97 to a position (point P2) apart to the inner side in the axial direction A by a distance Ta. The inclined portion 100 is formed between a point P1 intersecting the axial direction side surface 82a1 and the point P2 intersecting a plane for forming the original circulation path 85.

The inclined portion 100 is formed so that a distance with respect to a point Q positioned in a lower part of the connection portion 97 in the deflector 90 is equal to or larger than the diameter 2S of the rolling ball 51 in all positions on the surface between the point P1 and the point P2 when the deflector 90 is displaced in position from the desired position to the outer side in the radial direction with respect to the nut main body 80 by the maximum dimension (namely, the radial direction dimension B of the clearance). In order to avoid the path width of the circulation path 85 of the nut main body 80 being increased too much due to the inclined portion 100, it is not preferable that the inclined portion 100 is formed so that a cross-sectional shape is a straight line shape on the surface between the P1 and the P2 and it is preferable that the inclined portion 100 is formed so that a cross-sectional shape is a curved shape protruding downward.

In the structure of the ball screw nut 70 according to the modification example, even when the insertion position of the deflector 90 with respect to the deflector mounting hole 81 is displaced from the desired position to the outer side in the radial direction by the radial direction dimension B as shown in FIG. 15, narrowing of the path in the connection portion 97 is avoided, and an opening width in which the passage 94 and the circulation path 85 are effectively connected in the connection portion 97 is secured to be equal to or larger than the diameter 2S of the rolling ball 51. Accordingly, clogging of the rolling balls 51 in the vicinity of the connection portion 97 can be suppressed if the insertion position of the deflector 90 with respect to the deflector mounting hole 81 is displaced from the desired position to the outer side in the radial direction by the radial direction dimension B at the maximum.

In the structure of the nut main body 80 having the above inclined portion 100, it is not necessary to increase the path width itself in the entire region of the circulation path 85 of the nut main body 80 to be larger than the diameter 2S of the rolling ball 51 by the radial direction dimension B of the clearance for suppressing occurrence of clogging of the rolling balls 51, and the path width in portions other than the inclined portion 100 in the vicinity of the connection portion 97 in the circulation path 85 can be the same as the diameter 2S of the rolling ball 51 or slightly larger than the diameter 2S.

The circulation path 85 is formed so as to have the same path width as the diameter 2S of the rolling ball 51 or a path width slightly larger than the diameter 2S excluding the inclined portion 100. According to the structure, it is possible to suppress the plural rolling balls 51 being arranged in zigzag inside the circulation path 85 of the nut main body 80 and the plural rolling balls 51 are aligned in series, which is different from the structure in which the path width in the entire region of the circulation path 85 of the nut main body 80 is larger than the diameter 2S of the rolling ball 51 by the radial direction dimension B, therefore, circulation of the rolling balls 51 inside the circulation path 85 can be smooth.

Accordingly, also in the ball screw device 50 according to the modification example, smooth circulation of the rolling balls 51 can be secured while suppressing occurrence of clogging of the rolling balls 51 due to radial direction displacement between the deflector 90 and the nut main body 80 of the ball screw nut 70. Therefore, generation of torque variation due to clogging of balls can be suppressed and smooth steering feeling can be secured.

Figure 16:
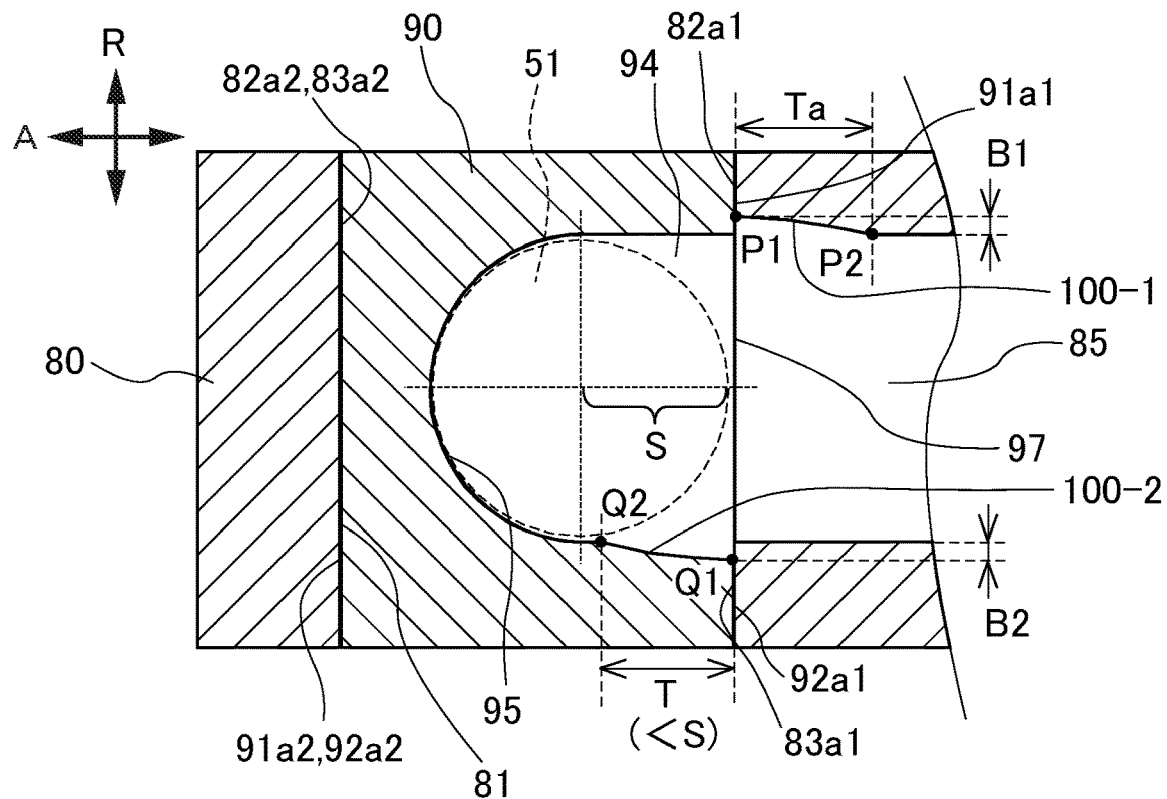
FIG. 16 is a cross-sectional view of a ball screw nut included in a ball screw device according to a second modification example of the present invention taken along a straight line IX-IX shown in FIG. 3.
Figure 17:
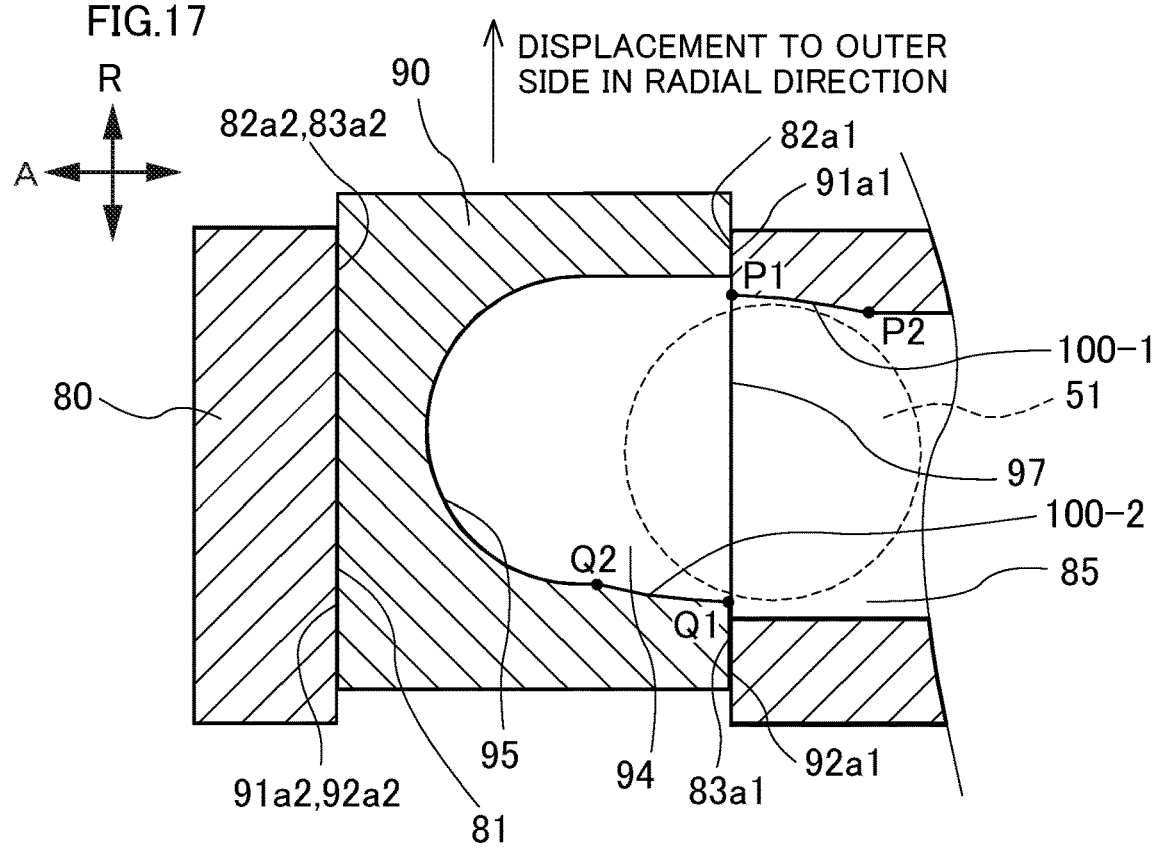
FIG. 17 is a view for explaining a state generated when the deflector is displaced in position with respect to the deflector mounting hole from a desired position to the outer side in the radial direction in the ball screw device according to the second modification example.

In the above modification example, the inclined portion 100 is provided in the nut main body 80 instead of the deflector 90. However, the present invention is not limited to this, and it is also preferable to provide the inclined portions 100 both in the deflector 90 and the nut main body 80 as shown in FIG. 16 and FIG. 17. Also according to the modification example, the same effects as those of the above embodiment and the above modification example can be obtained. In this modification example, an effective opening width in the connection portion 97 can be secured to be larger than the diameter 2S of the rolling ball 51 due to an inclined portion 100-1 in the nut main body 80 and an inclined portion 100-2 in the deflector 90, therefore, radial direction heights B1, B2 or chamfered areas at chamfered portions of respective inclined portions 100-1, 100-2 can be suppressed lower than the radial direction height B or a chamfered area at the chamfered portion of the inclined portion 100 according to the above embodiment or the above modification example. Accordingly, it is possible to avoid the path width of the circulation path 85 of the nut body portion 80 and the path width of the passage 94 of the deflector 90 being excessively increased due to the inclined portions 100-1, 100-2.

The present invention is not limited to the above embodiment and the modification examples, and various alterations may occur within a scope not departing from the gist of the present invention.

What is claimed is:
1. A ball screw device comprising:
a ball screw shaft including outer-peripheral rolling grooves formed in a spiral manner on an outer peripheral surface of the ball screw shaft;
a ball screw nut disposed on an axis of the ball screw shaft and on a radially outer side of the ball screw shaft, the ball screw nut being formed in a cylindrical shape so as to rotate relatively with respect to the ball screw shaft, the ball screw nut including inner-peripheral rolling grooves formed in a spiral manner on an inner peripheral surface of the ball screw nut, the bail screw nut including:
a nut main body having a deflector mounting, hole extending in a radial direction of the ball screw shaft; and
a deflector disposed in the deflector mounting hole on an outer side of the ball screw nut in the radial direction of the bail screw shaft and fixed to the ball screw nut;
a plurality of balls configured to roll in a rolling path surrounded by the outer-peripheral rolling grooves and the inner-peripheral rolling grooves; and
a circulation path communicating a first end of the rolling path to a second end of the rolling path so as to circulate the plurality of balls endlessly,
wherein:
at least part of the inner-peripheral rolling grooves and at least part of the circulation path are respectively formed in the nut main body,
the deflector forms a passage configured to communicate the inner-peripheral rolling grooves of the nut main body with the circulation path and to allow the plurality of balls to pass through the circulation path,
the deflector includes an open groove to form the passage that is continuous over (i) a first connection portion between a first end of the passage and the roiling path, and (ii) a second connection portion between a second end of the passage and the circulation path, the open groove being open to a side surface of a circulation path side,
at least one of the nut main body and the deflector has an inclined portion disposed at a peripheral part of the second connection portion at the second end of the passage, and
at a position where the circulation path of the nut main body and the passage of the deflector are connected, the inclined portion transfers the plurality of balls at the second connection portion when an insertion position of the deflector is displaced with respect to the deflector mounting hole from a first position within a range of a predetermined distance.

2. The ball screw device according to claim 1, wherein the inclined portion is configured to transfer the plurality of balls at the second connection portion when the insertion position of the deflector is displaced with respect to the deflector mounting hole from the first position in a radial outward direction within the range of the predetermined distance.

3. The ball screw device according to claim 2, wherein the inclined portion is provided at the peripheral part of the second connection portion and on an inner side in the radial direction with respect to the second connection portion in the deflector.

4. The ball screw device according to claim 2, wherein the inclined portion is provided at the peripheral part of the second connection portion and on an outer side in the radial direction with respect to the second connection portion and in the nut main body.

5. The ball screw device according to claim 1, wherein the inclined portion is closer to a side of the second connection portion than a side of the first connection portion in the deflector by a distance of a radius of each hall of the plurality of balls.

6. The ball screw device according to claim 1, wherein the inclined portion is formed such that an effective opening width of the second connection portion is greater than or equal to a diameter of each ball of the plurality of balls when the insertion position of the deflector is displaced with respect to the deflector mounting hole from the first position within the range of the predetermined given distance.

7. The ball screw device according to claim 1, wherein the deflector includes:
an inner-diameter side portion disposed on a radially inner side of the open groove, and
an outer-diameter side portion disposed on a radially outer side of the open groove, an outer edge position on an open groove side in a region occupied by the inner-diameter side portion is set inside an outer edge position on the open groove side in a region occupied by the outer-diameter side portion when the deflector is projected toward an insertion direction to the deflector mounting hole.

8. The ball screw device according to claim 7, wherein a width of the inner-diameter side portion in an axial direction of the ball screw nut is less than a width of the outer-diameter side portion in the axial direction of the ball screw nut.

9. The ball screw device according to claim 8, wherein the deflector mounting hole has a hole width corresponding to a width of the outer-diameter side portion in the axial direction of the ball screw nut and is greater than a width of the inner-diameter side portion in the axial direction of the hall screw nut.

10. The ball screw device according to claim 7, wherein the outer-diameter side portion includes a press-fitting portion press-fitted to the deflector mounting hole.

11. The ball screw device according to claim 10, wherein the press-fitting portion is provided on a side surface on which the open groove is formed.

12. The ball screw device according to claim 10, wherein the press-fitting portion includes a first press-fitting portion and a second press-fitting portion, each of the first press-fitting portion and the second press-fitting portion being respectively disposed at two end portions of the deflector in a circumferential direction, and the first press-fitting portion and the second press-fitting portion being disposed on a side surface on which the open groove is formed.

13. The ball screw device according to claim 12, wherein the first press-fitting portion and the second press-fitting portion are disposed at protruding portions protruding in the axial direction of the ball screw nut with respect to remaining portions of the outer-diameter side portion.

14. A steering device comprising the ball screw device according to claim 1.

15. The ball screw device according to claim 1, wherein the inclined portion is disposed at an inner peripheral surface of at least one of the circulation path and the passage connected at the second connection portion, and the inclined portion being open to the circulation path or the passage and being formed such that a path width increases towards the second connection portion.

* * * * *